United States Patent
Fukuyama et al.

(10) Patent No.: US 7,192,380 B2
(45) Date of Patent: Mar. 20, 2007

(54) TOROIDAL CONTINUOUSLY VARIABLE TRANSMISSION

(75) Inventors: Masatoshi Fukuyama, Nagoya (JP); Toshifumi Hibi, Kanagawa (JP); Jun Sugihara, Kanagawa (JP); Toshikazu Oshidari, Kanagawa (JP)

(73) Assignee: Jatco Ltd, Fuji (JP)

( * ) Notice: Subject to any disclaimer, the term of this patent is extended or adjusted under 35 U.S.C. 154(b) by 525 days.

(21) Appl. No.: 10/625,470

(22) Filed: Jul. 23, 2003

(65) Prior Publication Data

US 2005/0079947 A1     Apr. 14, 2005

(30) Foreign Application Priority Data

Jul. 26, 2002  (JP) .............................. 2002-217675

(51) Int. Cl.
  *F16H 15/38*   (2006.01)

(52) U.S. Cl. ........................................... 476/10; 476/40

(58) Field of Classification Search .................. 476/10, 476/40, 42, 46
See application file for complete search history.

(56) References Cited

U.S. PATENT DOCUMENTS

| | | | |
|---|---|---|---|
| 2,800,036 A * | 7/1957 | Miller | .......................... 477/53 |
| 3,696,613 A | 10/1972 | Goodale | |
| 3,926,075 A | 12/1975 | Kronstadt | |
| 5,194,052 A | 3/1993 | Ueda et al. | |
| 6,030,309 A | 2/2000 | Nakano | |
| 2002/0169051 A1 | 11/2002 | Oshidari | |

FOREIGN PATENT DOCUMENTS

| | | |
|---|---|---|
| EP | 0 967 413 A1 | 12/1999 |
| EP | 1 256 744 A2 | 11/2002 |
| JP | 04-0282668 U | 3/1992 |
| JP | 10-324177 A | 12/1998 |
| JP | 10-331938 A | 12/1998 |
| JP | 11-082655 A | 3/1999 |
| JP | 11-94062 A | 4/1999 |
| JP | 11-101321 A | 4/1999 |
| JP | 2001-165287 A | 6/2001 |
| JP | 2002-327836 A | 11/2002 |

* cited by examiner

*Primary Examiner*—William C. Joyce
(74) *Attorney, Agent, or Firm*—Foley & Lardner LLP

(57) ABSTRACT

In a toroidal continuously variable transmission, a primary oil pump is driven by an engine, whereas a secondary oil pump is driven in response to rotation of a road wheel. A hydraulic servo mechanism is connected to a trunnion to create an offset of the trunnion from a neutral position for a tilting motion of the power roller. Also provided is a hydraulic system that supplies the hydraulic pressure discharged from the secondary pump to the hydraulic servo mechanism to prevent the offset of the trunnion in the trunnion-axis direction, corresponding to an upshift, occurring owing to rotation of the road wheel in a stopped state of the engine. A modulated hydraulic pressure, which is constantly produced by the hydraulic system during operation of the engine, acts to hold the secondary pump at either of an inoperative state and an unloaded condition during the operation of the engine.

14 Claims, 7 Drawing Sheets

(HYDRAULIC PRESSURE CONSTANTLY PRODUCED DURING OPERATION OF PRIME MOVER)

(SUCTION) (DISCHARGE)

(HYDRAULIC PRESSURE CONSTANTLY PRODUCED DURING OPERATION OF PRIME MOVER)

(SUCTION) (DISCHARGE)

(HYDRAULIC PRESSURE CONSTANTLY PRODUCED DURING OPERATION OF PRIME MOVER)

(SUCTION) (DISCHARGE)

(HYDRAULIC PRESSURE CONSTANTLY PRODUCED DURING OPERATION OF PRIME MOVER)

(HYDRAULIC PRESSURE CONSTANTLY PRODUCED DURING OPERATION OF PRIME MOVER)

(HYDRAULIC PRESSURE CONSTANTLY PRODUCED DURING OPERATION OF PRIME MOVER)

(HYDRAULIC PRESSURE CONSTANTLY PRODUCED DURING OPERATION OF PRIME MOVER)

(HYDRAULIC PRESSURE CONSTANTLY PRODUCED DURING OPERATION OF PRIME MOVER)

TOROIDAL CONTINUOUSLY VARIABLE TRANSMISSION

TECHNICAL FIELD

The present invention relates to a toroidal continuously variable transmission for an automotive vehicle.

BACKGROUND ART

In recent years, to meet demands for increased shift comfort, improved driveability, and reduced fuel consumption and exhaust emissions, there have been proposed and developed toroidal continuously variable transmissions often abbreviated to "toroidal CVTs", in which a transmission ratio is steplessly variable within limits. One such toroidal CVT has been disclosed in Japanese Patent Provisional Publication No. 10-331938 (hereinafter is referred to as "JP 10-331938"), corresponding to U.S. Pat. No. 6,030,309. On such a toroidal CVT as disclosed in JP 10-331938, engine power (output torque) is transmitted from an input disk to an output disk via a traction oil film formed between a power roller and each of the input and output disks, using a shearing force in the traction oil film at high contact pressure. The input and output disks coaxially oppose each other. The toroidal CVT has a trunnion serving as a power roller support that rotatably supports the power roller, which is interposed between the input and output disks and is in contact with a torus surface of each of the input and output disks under preload. During transmission-ratio changing of the toroidal CVT, in order to obtain a desired transmission ratio determined based on the magnitude of a gyration angle of the power roller, the power roller is shifted from a neutral position, at which a rotation axis of the power roller intersects the center of rotation (common rotation axis) of the input and output disks, by slightly shifting or displacing the trunnion in a direction of a trunnion axis perpendicular to the rotation axis of the power roller via a servo piston of a hydraulic servo mechanism that operates in response to a hydraulic pressure generated by a prime-mover driven oil pump that is constantly driven by a prime mover (an engine) during operation of the prime mover. In more detail, during a forward running mode the hydraulic pressure is directed to the hydraulic servo mechanism via a forward ratio control valve, whereas during a reverse running mode the hydraulic pressure is directed to the hydraulic servo mechanism via a reverse ratio control valve. By virtue of a side slip force occurring in a very limited contact zone between the power roller and the input and output disks due to the slight offset or slight vertical displacement of the power roller, the power roller is self-tilted or self-inclined. Owing to the self-inclining motion of the power roller, a first diameter of a circular-arc shaped locus drawn by movement of the very limited contact point between the power roller and the output disk on the torus surface of the output disk and a second diameter of a circular-arc shaped locus drawn by movement of the very limited contact point between the power roller and the input disk on the torus surface of the input disk, that is, a ratio of the first to second diameter can be continuously varied, thus continuously varying a transmission ratio. Generally, in the toroidal CVT, a degree of progress for transmission-ratio changing is fed back to the hydraulic servo mechanism, so that the trunnion gradually returns to its initial position as the transmission-ratio changing progresses. When the gyration angle based on a desired transmission ratio corresponding to a transmission-ratio command signal value has been reached, the vertical displacement of the trunnion is returned to zero, so as to terminate the inclining motion of the power roller, and to attain the return of the power roller to neutral, and thus to maintain the desired transmission ratio corresponding to the ratio command signal value.

In the previously-noted prime-mover driven oil pump, pressurized working fluid (pressurized traction oil) is continuously discharged from the pump during operation of the prime mover. Therefore, during operation of the prime mover, the hydraulic servo mechanism is controllable by way of hydraulic pressure produced by the prime-mover driven oil pump. However, suppose that torque backwardly flows from road wheels to the output disk owing to hauling or coasting in a stopped state of the prime mover in which there is no hydraulic pressure produced by the prime-mover driven oil pump and needed for ratio change control, and thus the hydraulic servo mechanism is in an uncontrolled state. In such a case, there is an increased tendency for the toroidal CVT to undesirably shift up, for the reasons discussed above.

When the output disk is driven by road wheels due to back-flow of torque from the road wheels to the output disk, as a push-back force or a reaction force from a contact portion between the power roller and the input shaft, the power roller, interposed between the input and output disks under preload, receives a component force acting in the trunnion-axis direction. This causes a slight offset of the power roller from its neutral position in the trunnion-axis direction that upshifts the toroidal CVT to a higher transmission ratio. As a result of this, owing to the self-inclining motion of the power roller, the upshift of the toroidal CVT to a higher transmission ratio undesirably occurs. If the prime mover is restarted and the vehicle is accelerated from standstill on the assumption that the toroidal CVT has been undesirably upshifted to a high transmission ratio owing to hauling or coasting in the stopped state of the prime mover, there are the following drawbacks.

During early stages of vehicle starting, a desired transmission ratio corresponding to a transmission-ratio command signal is generally set at a predetermined lowest ratio. As is generally known, ratio changing operation can be made only in presence of torque transmission after the vehicle is started. As a matter of course, just before starting the vehicle, there is no torque transmission, and thus the vehicle is restarted at the transmission ratio remaining high on the assumption discussed above. This is often called as a "high-ratio starting". During the so-called high-ratio starting, there is a lack in torque, thus deteriorating the starting performance of the vehicle. To avoid the high-ratio starting, Japanese Patent Provisional Publication No. 2002-327836 (hereinafter is referred to as "JP2002-327836"), corresponding to United States Patent Application Publication No. US 2002/0169051 A1, published Nov. 14, 2002, teaches the use of a secondary oil pump as well as a primary oil pump (a prime-mover driven oil pump).

SUMMARY OF THE INVENTION

The secondary oil pump, disclosed in JP2002-327836, is driven in response to rotation of the road wheel to produce a hydraulic pressure. By means of the secondary oil pump it is possible to prevent the toroidal CVT from being undesirably upshifted to a high transmission ratio owing to hauling or coasting in the stopped state of the prime mover, and thus to avoid the high-ratio starting. However, during operation of the prime mover, such as during a usual vehicle driving, the secondary oil pump is constantly driven in response to rotation of the road wheel, thereby resulting in increased running resistance, in other words, increased fuel consumption. For instance, in case that the secondary oil pump is constructed by a reciprocating plunger pump that a reciprocating plunger is permanently biased to a plunger pump driving member such as a cam by means of a return spring, due to a relatively great sliding resistance the tendency of increased running resistance (increased fuel consumption) is remarkable. Thus, it would be desirable to provide a means by which it is possible to prevent the secondary oil pump from being driven in response to rotation of the road wheel during operation of the prime mover.

Accordingly, it is an object of the invention to provide a toroidal continuously variable transmission for an automotive vehicle, employing an auxiliary oil pump (a secondary oil pump) as well as a prime-mover driven oil pump (a primary oil pump), capable of preventing the secondary oil pump from being driven in response to rotation of a road wheel at least during operation of the prime mover or capable of permitting the secondary oil pump to be driven in an unloaded condition even if the secondary oil pump is driven in response to rotation of the road wheel during operation of the prime mover.

In order to accomplish the aforementioned and other objects of the present invention, a toroidal continuously variable transmission comprises an input disk to which rotation of a prime mover is transmitted, an output disk coaxially arranged with and opposed to the input disk, the output disk adapted to have a driving connection with and to have a driven connection with a road wheel, a power roller interposed between the input and output disks under axial preload for power transmission, a trunnion rotatably supporting the power roller to permit a tilting motion of the power roller about a trunnion axis perpendicular to a rotation axis of the power roller for ratio changing, a hydraulic servo mechanism connected to the trunnion to move the trunnion in a direction of the trunnion axis so as to cause the tilting motion of the power roller by creating an offset of the trunnion from a neutral position in the direction of the trunnion axis, the neutral position being a non-ratio-changing position at which the rotation axis of the power roller intersects a common rotation axis of the input and output disks, a primary oil pump driven by the prime mover to produce a hydraulic pressure, a secondary oil pump driven in response to rotation of the road wheel to produce a hydraulic pressure, the hydraulic servo mechanism hydraulically operated by either of the hydraulic pressure from the primary oil pump and the hydraulic pressure from the secondary oil pump, a ratio-change-control hydraulic system that supplies the hydraulic pressure discharged from the secondary oil pump to the hydraulic servo mechanism to prevent the offset of the trunnion in the trunnion-axis direction, corresponding to an upshift, occurring owing to rotation of the road wheel in a stopped state of the prime mover, and the ratio-change-control hydraulic system by which a modulated hydraulic pressure is constantly produced and outputted to the secondary oil pump during operation of the prime mover to hold the secondary oil pump at an inoperative state during the operation of the prime mover.

The other objects and features of this invention will become understood from the following description with reference to the accompanying drawings.

DESCRIPTION OF THE PREFERRED EMBODIMENTS

Figure 1:
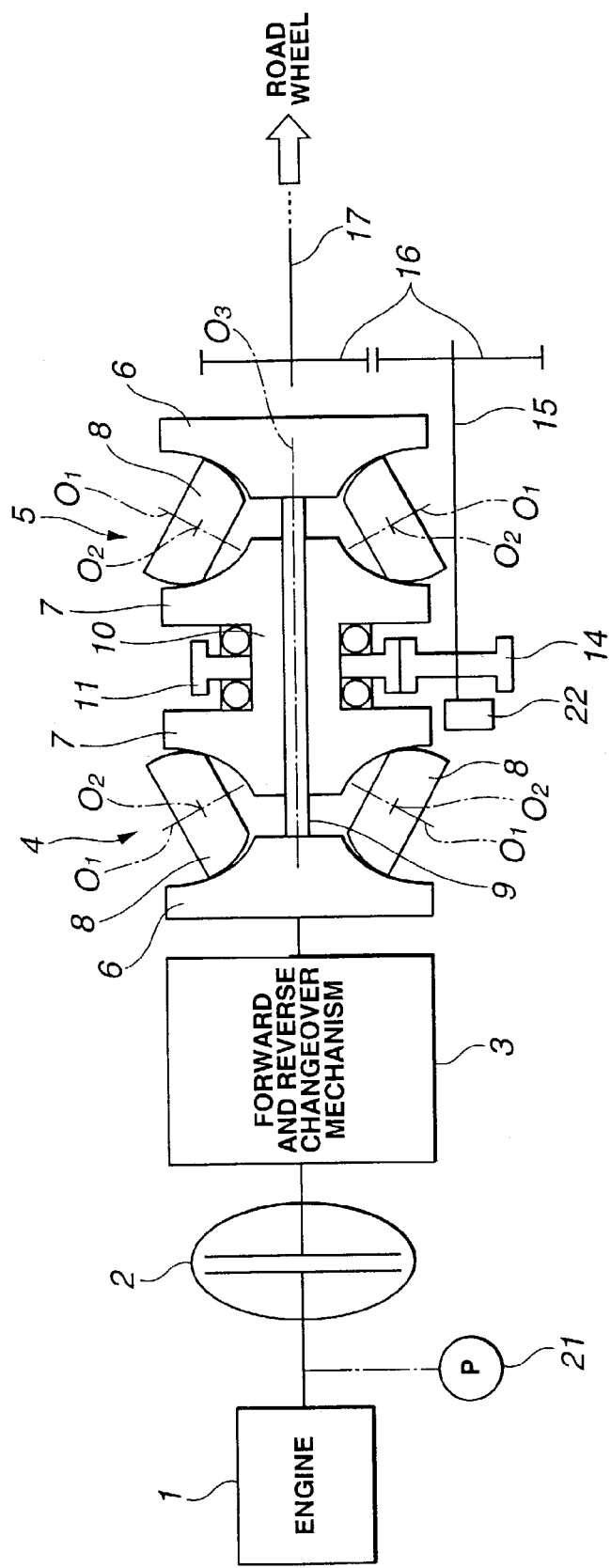
FIG. 1 is a system diagram illustrating an embodiment of a toroidal continuously variable transmission for an automotive vehicle employing primary and secondary oil pumps.

Referring now to the drawings, particularly to FIG. 1, a toroidal continuously variable transmission (abbreviated to "toroidal CVT") of the embodiment is exemplified in a half-toroidal continuously variable transmission combined with a lock-up torque converter 2. In the power train for the toroidal CVT of the embodiment shown in FIG. 1, engine torque (driving torque) is transmitted from an engine 1, serving as a prime mover, via lock-up torque converter 2 to a forward and reverse changeover mechanism (F/R changeover mechanism) 3. F/R changeover mechanism 3 functions to transmit input rotation to an input shaft or an input disk of the toroidal CVT without changing a direction of rotation in a drive range (D range) of a forward running mode. F/R changeover mechanism 3 also functions to transmit input rotation to the toroidal CVT input shaft while changing a direction of the input rotation in a reverse range (R range). That is, F/R changeover mechanism 3 reversibly transmits the input rotation of the prime mover to the input disk. F/R changeover mechanism 3 further functions to shut off power transmission to the toroidal CVT input shaft in a parking range (P range) or a neutral range (N range). F/R changeover mechanism 3 is generally comprised of a planetary gearset, a forward clutch, and a reverse brake. At the subsequent stage of the F/R changeover mechanism, a front toroidal CVT mechanism (or a first variator unit) 4 and a rear toroidal CVT mechanism (or a second variator unit) 5 are set in tandem and coaxially arranged in the interior space of the toroidal CVT casing in a manner so as to construct a so-called "double cavity type toroidal CVT". First and second toroidal CVT mechanisms 4 and 5 have the same construction. First toroidal CVT 4 is comprised of a pair of input and output disks 6 and 7 coaxially arranged and opposing each other, a pair of power rollers (8, 8), and a power roller support or a trunnion 12 (describer later). Each of input and output disks 6 and 7 has a torus surface. Power rollers (8, 8) are interposed between input and output disks 6 and 7, such that power rollers (8, 8) are in contact with the torus surfaces of input and output disks 6 and 7 under axial preload. Power rollers (8, 8) are symmetrically arranged to each other with respect to a main torque transmission shaft 9. First and second CVT mechanisms 4 and 5 are arranged in reverse to each other on main torque transmission shaft 9, such that the output disk included in first toroidal CVT mechanism 4 and the output disk included in second toroidal CVT mechanism 5 are opposed to each other with respect to an output gear 11 fixedly connected onto a cylindrical hollow output shaft 10. Although it is not clearly shown in FIG. 1, of two input disks (6, 6), the input disk included in first toroidal CVT mechanism 4 is preloaded axially rightwards (viewing FIG. 1) by means of a loading cam device (not shown). The loading cam device is designed to produce a magnitude of the axial preload substantially proportional to input torque transmitted from lock-up torque converter 2 via F/R changeover mechanism 3 to the toroidal CVT input shaft. On the other hand, the input disk included in the second toroidal CVT mechanism 5 is permanently biased axially leftwards (viewing FIG. 1) by way of a spring bias. Each of input disks (6, 6) is supported on main torque transmission shaft 9 by way of ball-spline-engagement, so as to permit each of input disks (6, 6) to axially move relative to the main torque transmission shaft, and to rotate about the main torque transmission shaft. Output disks (7, 7) and cylindrical hollow output shaft 10 are integrally connected to each other or integrally formed with each other, and coaxially arranged with each other. Output disks (7, 7) are linked to output gear 11 via cylindrical hollow output shaft 10 by way of spline engagement. In contrast to input disks (6, 6), each of output disks (7, 7) is axially stationary. Thus, output gear ills rotatable relative to main torque transmission shaft 9.

Figure 3:
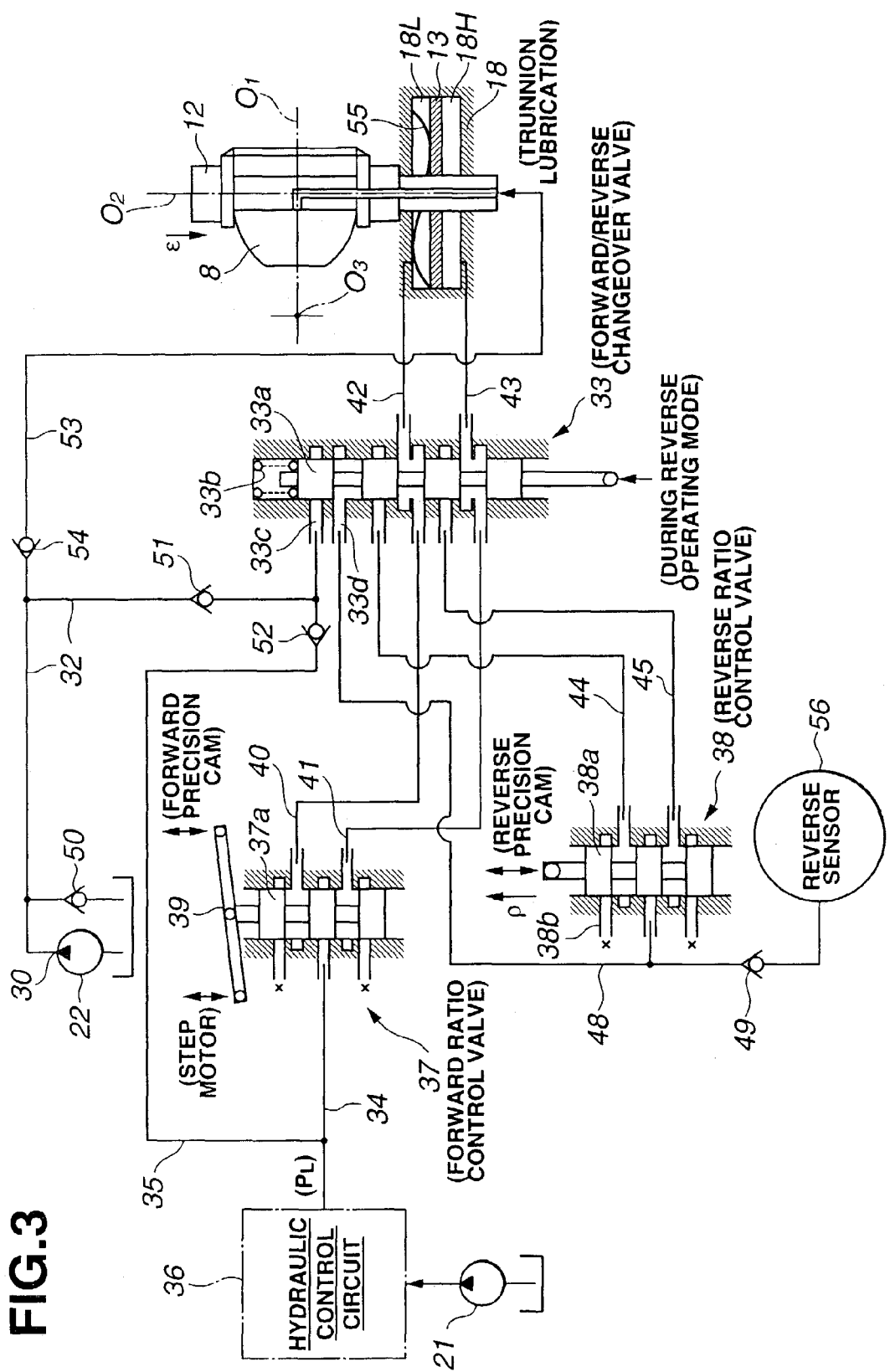
FIG. 3 is a hydraulic circuit diagram of a hydraulic system containing a transmission-ratio change control system of the toroidal CVT of the embodiment.

As seen from the right-hand side of the hydraulic circuit diagram of FIG. 3, each of power rollers (8, 8, 8, 8) is supported on one end of each of trunnions (12, 12, 12, 12). Power rollers (8, 8, 8, 8) are rotatable about the respective power-roller rotation axes ($O_1$, $O_1$, $O_1$, $O_1$). Each of servo pistons (13, 13, 13, 13), serving as a hydraulic servo mechanism, is coaxially fixedly connected onto the other end of each of the trunnions, so as to tilt each of the power rollers by shifting trunnions (12, 12) of first toroidal CVT mechanism 4 in opposite directions of their trunnion axes perpendicular to the power-roller rotation axes. That is, all of the trunnions are shifted in phase and synchronously with each other by means of the four servo pistons. As clearly seen from the cross section of the hydraulic servo mechanism of FIG. 3, servo piston 13 is slidably fitted into the cylinder defined in a servo piston body 18, to define a low-pressure piston chamber 18L and a high-pressure piston chamber 18H. In one power roller 8 of the first power-roller group, shown in FIG. 3, the upper piston chamber serves as low-pressure piston chamber 18L, whereas the lower piston chamber serves as high-pressure piston chamber 18H. On the contrary, in the other power roller 8 of the first power-roller group, the upper piston chamber serves as high-pressure piston chamber 18H, whereas the lower piston chamber serves as low-pressure piston chamber 18L. This is because, during ratio changing operation, power rollers (8, 8) of the first power-roller group are shifted from their neutral positions in phase and in synchronization with each other in opposite directions of trunnion axes ($O_2$, $O_2$) perpendicular to the power-roller rotations axes ($O_1$, $O_1$) by means of the respective servo pistons (13, 13).

The ratio changing operation and power flow of the toroidal CVT of the embodiment are described hereunder.

Input rotation or input torque is transmitted from F/R changeover mechanism 3 simultaneously to both the two input disks (6, 6). The input torque is further transmitted from input disks (6, 6) to the respective power rollers (8, 8, 8, 8), so as to cause rotation of each of the power rollers about its rotation axis $O_1$. Then, torque is transmitted from the power rollers via output disks (7, 7) to output gear 11 common to the two output disks. The torque is transmitted from output gear 11 to a counter gear 14 in meshed-engagement with output gear 11 and fixedly connected to a countershaft 15. The torque is further transmitted via a gearset 16 and a toroidal CVT output shaft 17 coupled to a propeller shaft (not numbered) to the drive wheels, in that order. During ratio changing, each of the power rollers is tilted or inclined so that the magnitude of a gyration angle based on a desired transmission ratio is attained. In accordance with a continuous change in the gyration angle, the torque is transmitted to each output disk while steplessly varying an input speed of each input disk. More concretely, during ratio changing, the power rollers are shifted from their neutral positions (non-ratio-changing positions) shown in FIGS. 1 and 3 in phase and in synchronization with each other in directions of trunnion axes ($O_2$, $O_2$, $O_2$, $O_2$) normal to the power-roller rotation axes ($O_1$, $O_1$, $O_1$, $O_1$) through trunnions (12, 12, 12, 12) by means of the servo pistons (13, 13, 13, 13). The previously-noted neutral position corresponds to a non-ratio-changing position at which the power-roller rotation axis $O_1$ intersects a common rotation axis $O_3$ of the input and output disks. Shifting the power rollers (8, 8, 8, 8) from their neutral positions causes an offset or a vertical displacement of each of power-roller rotation axes ($O_1$, $O_1$, $O_1$, $O_1$) from the rotation axis $O_3$ of input and output disks 6 and 7. Owing to the offset (or the vertical displacement), a side slip force occurs in a very limited contact zone between each of the power rollers and the associated input and output disks. By virtue of the side slip forces, the power rollers can be self-tilted or self-inclined in phase and in synchronization about the respective trunnion axes ($O_2$, $O_2$, $O_2$, $O_2$). Owing to the self-inclining motion of each of the power rollers, a first diameter of a circular-arc shaped locus drawn by movement of the very limited contact point between each of the power rollers and the output disk on the torus surface of the output disk and a second diameter of a circular-arc shaped locus drawn by movement of the very limited contact point between each of the power rollers and the input disk on the torus surface of the input disk, that is, a ratio of the first diameter to the second diameter can be continuously varied, thus steplessly varying a transmission ratio of the double cavity type toroidal CVT. On the other hand, a degree of progress for transmission-ratio changing is mechanically fed back to the hydraulic servo mechanism, that is, servo pistons (13, 13, 13, 13) by means of a forward precision cam (described later) in the forward running mode and also by means of a reverse precision cam (described later) in the reverse running mode, such that each of the trunnions gradually returns to its initial position as the ratio changing progresses. As soon as the gyration angle based on the desired transmission ratio corresponding to a transmission-ratio command signal value has been reached, the offset (vertical displacement) of each of the trunnions is returned to zero, so as to stop the inclining motion of each of the power rollers, and to attain the return of each power roller to neutral, and thus to maintain the desired transmission ratio corresponding to the ratio command signal value.

During ratio changing operation in the D range (the forward running mode), an upshift of the toroidal CVT to a higher transmission ratio is achieved by supplying the hydraulic pressure to high-pressure piston chamber 18H (see FIG. 3), and simultaneously by draining the hydraulic pressure from low-pressure piston chamber 18L (see FIG. 3). During ratio changing operation in the D range (the forward running mode), a downshift of the toroidal CVT to a lower transmission ratio is achieved by supplying the hydraulic pressure to low-pressure piston chamber 18L (see FIG. 3), and simultaneously by draining the hydraulic pressure from high-pressure piston chamber 18H.

On the other hand, during ratio changing operation in the R range (the reverse running mode), F/R changeover mechanism 3 (see FIG. 1) transmits input rotation to the toroidal CVT input shaft while changing a direction of the input rotation. Thus, during the ratio change in the R range, a downshift of the toroidal CVT to a lower transmission ratio is achieved by supplying the hydraulic pressure to high-pressure piston chamber 18H, and simultaneously by draining the hydraulic pressure from low-pressure piston chamber 18L. During the ratio change in the R range, an upshift of the toroidal CVT to a higher transmission ratio is achieved by supplying the hydraulic pressure to low-pressure piston chamber 18L, and simultaneously by draining the hydraulic pressure from high-pressure piston chamber 18H.

For the purpose of the ratio changing control of the toroidal-CVT as well as switching control (of F/R changeover mechanism 3) between forward and reverse running modes, as shown in FIG. 1, a primary oil pump 21 (or a prime-mover driven oil pump), which is driven by engine 1, is provided. In the toroidal CVT of the embodiment, a secondary oil pump 22, called "output-rotation driven pump", is provided in addition to primary oil pump 21. Secondary oil pump 22 is mechanically linked to the front end of countershaft 15, so that secondary oil pump 22 is driven in response to input rotation transmitted from the road wheels through transmission output shaft 17 and gearset 16 to countershaft 15. As best seen from FIG. 1, countershaft 15 is permanently coupled to axle driveshafts of the road wheels through gear set 16 and transmission output shaft 17, and thus secondary oil pump 22 can be driven in response to input rotation transmitted from the road wheels to countershaft 15, while the vehicle is pulled or coasting after engine 1 (prime mover) has been stopped.

Figure 2A:
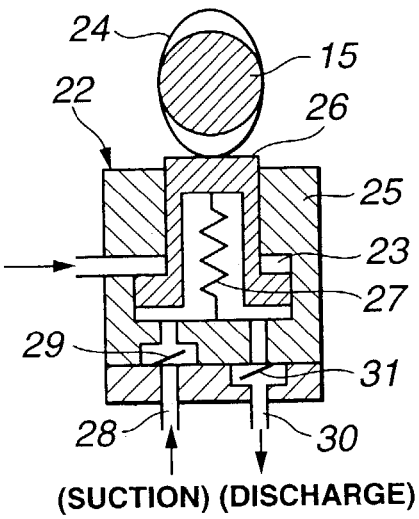
FIG. 2A is an enlarged longitudinal cross-sectional view illustrating an essential part of the secondary oil pump that is incorporated within the toroidal CVT of the embodiment, and driven in response to rotation transferred from the road wheels to the transmission output shaft, and conditioned in a discharge stroke.
Figure 2B:
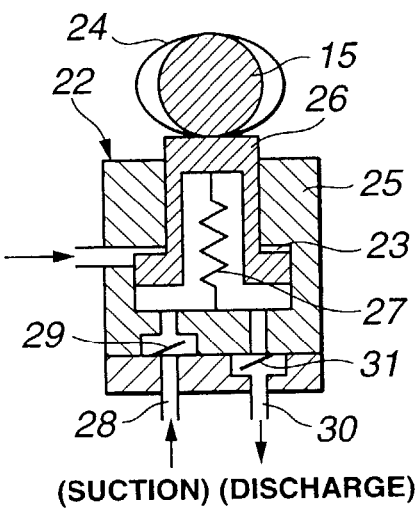
FIG. 2B is an enlarged longitudinal cross-sectional view illustrating an essential part of the secondary oil pump that is conditioned in a suction stroke.
Figure 2C:
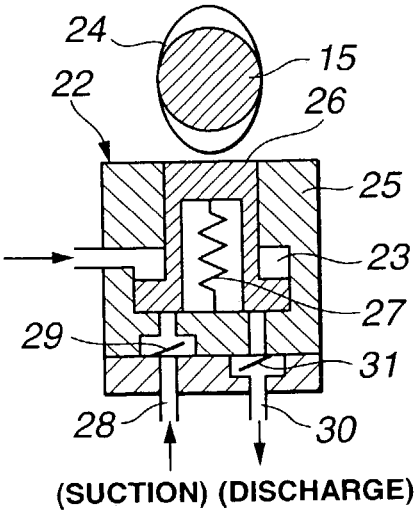
FIG. 2C is an enlarged longitudinal cross-sectional view illustrating an essential part of the secondary oil pump that is kept in an inoperative state.

As can be seen from the cross sections illustrated in FIGS. 2A, 2B, and 2C, in the toroidal CVT of the embodiment, secondary oil pump 22 is constructed as a reciprocating plunger pump that is comprised of an eccentric cam (or a pump driving element) 24 and a radial plunger (or a reciprocating pumping element) 26. The input shaft (the pump shaft) of eccentric cam 24 is fixedly connected to the front end of countershaft 15 by means of a pin (not shown). Eccentric cam is operatively accommodated in a pump housing 25. Radial plunger 26 is slidably fitted into the cylinder defined in pump housing 25. Radial plunger 26 is permanently spring-loaded or biased toward the cam contour surface of eccentric cam 24 by means of a return spring 27. As shown in FIGS. 2A and 2B, usually, the upper end of radial plunger 26 is in sliding-contact with the cam contour surface of eccentric cam 24, and thus radially reciprocates in synchronism with rotation of eccentric cam 24. During the suction stroke shown in FIG. 2B, working fluid (traction oil) is inducted from an oil pan into secondary oil pump 22 through an inlet port 28 and an inlet valve 29 owing to the upward stroke (viewing FIG. 2B) of radial plunger 26. As a matter of course, for the purpose of oil induction, inlet port 28 is formed in pump housing 25 in such a manner as to open at the underside of the oil level of the oil pan. During the discharge stroke shown in FIG. 2A, working fluid (traction oil) is discharged from a discharge port 30 formed in pump housing 25 through a discharge valve 31 into the oil pan owing to the downward stroke (viewing FIG. 2A) of radial plunger 26.

As shown in FIGS. 2A–2C, the upper end (the first end) of radial plunger 26 is formed as a sliding-contact surface that is usually in sliding-contact with the cam contour surface of eccentric cam 24, whereas the lower end (the second end) of radial plunger 26 is formed as a relatively large-diameter pressure receiving flanged end. The relatively large-diameter flanged end of radial plunger 26 serves to define a plunger retracting chamber 23 located to be opposite to the pumping chamber that communicates with inlet port 28 via inlet valve 29 and communicates with discharge port 30 via discharge valve 31 and accommodates therein the return spring 27. Plunger retracting chamber 23 is defined in pump housing 25 in conjunction with the relatively large-diameter flanged end of radial plunger 26 (see FIGS. 2A–2C). As will be fully described later, in the toroidal CVT of the embodiment, a modulated hydraulic pressure ($P_C$, $P_L$, Pt, $P_P$), which is constantly produced or generated by a hydraulic control circuit 36 (described later) and modulated from a discharge pressure from primary oil pump (the prime-mover driven oil pump) 21 during operation of the prime mover, is delivered or fed into plunger retracting chamber 23 of secondary oil pump 22.

When the prime mover (engine 1) is stopped and conditioned in its inoperative state, there is no hydraulic pressure produced by primary oil pump 21. In this case, radial plunger 26 of secondary oil pump (output-rotation driven pump) 22 is brought into sliding-contact with the cam contour surface of eccentric cam 24 by way of the spring bias of return spring 27. Under this condition, the secondary oil pump system permits radial plunger 26 to reciprocate between the stroke positions shown in FIGS. 2A and 2B by means of eccentric cam 24 that is rotated in response to input rotation transmitted from the road wheels through transmission output shaft 17 and gearset 16 to countershaft 15. The reciprocating motion of radial plunger 26 causes a pumping action. Conversely when the prime mover (engine 1) is running and conditioned in its operative state, there is a supply of hydraulic pressure, produced by primary oil pump 21, into plunger retracting chamber 23. As a result of this, as shown in FIG. 2C, radial plunger 26 of secondary oil pump 22 is retracted and positioned to be spaced apart from the cam contour surface of eccentric cam 24. That is, during operation of the prime mover, second oil pump 22 can be held at the inoperative state by maintaining the pumping element (plunger 26) in a spaced, contact-free relationship with the pump driving element (eccentric cam 24) by way of the modulated hydraulic pressure ($P_C$, $P_L$, Pt, $P_P$), which is constantly produced by hydraulic control circuit 36 (described hereunder) during operation of the prime mover. With radial plunger 26 held at its retracted position during operation of the prime mover (engine 1), radial plunger 26 is not driven by means of eccentric cam 24 that is rotated in response to input rotation transmitted from the road wheels to countershaft 15. As discussed above, in the toroidal CVT of the embodiment, even if eccentric cam 24 is rotated in response to rotation of the road wheels, secondary oil pump 22 can be kept in the inoperative state during operation of the prime mover (engine 1).

As can been seen from the hydraulic circuit diagram of the hydraulic system for transmission-ratio change control shown in FIG. 3, discharge port 30 of secondary oil pump 22 of FIGS. 2A–2C is fluidly connected via a pump pressure discharge circuit 32 to the ratio-change-control hydraulic circuit. The ratio-change-control hydraulic circuit includes hydraulic control circuit 36 (see the left-hand side of FIG. 3). Details of hydraulic control circuit 36 will be described later in reference to the circuit diagram shown in FIG. 4. Hydraulic control circuit 36 receives the pressurized working fluid (pressurized traction oil) discharged from primary oil pump 21 and then regulates or modulates it to a line pressure $P_L$. The output pressure (line pressure $P_L$) from hydraulic control circuit 36 is supplied into both of a main circuit 34 and a sub circuit 35 branched from main circuit 34. A forward ratio control valve 37 is fluidly disposed in main circuit 34. Sub circuit 35 is fluidly connected to a sub circuit 48 through ports 33c and 33d of a forward/reverse changeover valve 33. A reverse ratio control valve 38 is fluidly disposed in sub circuit 48. Typical details of forward and reverse ratio control valves 37 and 38 are set forth, for example, in Japanese Patent Provisional Publication No. 11-94062. As clearly shown in FIG. 3, forward/reverse changeover valve 33 is fluidly disposed between the ratio control valve pair (37, 38) and a pair of piston chambers 18L and 18H defined on both sides of servo piston 13. Forward ratio control valve 37, reverse ratio control valve 38, forward/reverse changeover valve 33, and the other valves such as a plurality of check valves are built in a control valve body (not shown). In a conventional manner, switching of the axial position of a spool 33a (slidably accommodated in the control valve body) of forward/reverse changeover valve 33 between its forward and reverse positions is made by means of a reverse sensor 56 (see FIG. 3). Reverse sensor 56 is mechanically linked to countershaft 15 in such a manner as to cause axial movement of spool 33a against the spring bias of a return spring 33b in response to reverse rotation of countershaft 15, and simultaneously to monitor or detect the axial position of spool 33a, in other words, the rotation direction of countershaft 15. Return spring 33b acts on the upper spool end of spool 33a to force the spool toward its spring-loaded position (the downward position shown in FIG. 3). For example, reverse sensor 56 may be constructed as a mechanical reverse sensor comprised of a one-way clutch and a reverse-rotation sensing arm mechanically linked via the one-way clutch to the lower spool end. In this case, during the forward running mode, that is, during normal rotation of countershaft 15, the reverse-rotation sensing arm rotates together with countershaft 15 in the normal-rotational direction, and additionally the one-way clutch rotates freely on the outer periphery of countershaft 15, and as a result the reverse-rotation sensing arm is held in a spaced relationship with the lower spool end, and thus spool 33a is held at the spring-loaded position (in other words, in the forward operating mode position) by way of the spring bias of return spring 33b. In contrast, during the reverse running mode, that is, during reverse rotation of countershaft 15, the reverse-rotation sensing arm rotates together with countershaft 15 in the reverse-rotational direction. Additionally the one-way clutch self-engages. As a result, the reverse-rotation sensing arm is brought into contact with the lower spool end, and then pushes the lower spool end such that spool 33a moves upward against the spring bias and held in a retracted position (in other words, in the reverse operating mode position).

Forward ratio control valve 37 includes a spool 37a and an I-shaped link ratio-control lever 39 whose central portion is mechanically linked or pin-connected to spool 37a. One end of I-shaped ratio-control link lever 39 is linked or pin-connected to the front end of a motor-driven shaft of a step motor in such a manner as to create a displacement of the one end of I-shaped link lever 39 in an axial direction of spool 37a. There is a one-to-one correspondence between the displacement of the one end of I-shaped link lever 39 and the ratio command signal value or the desired transmission ratio. The other end of I-shaped link lever 39 is linked or pin-connected to a forward precision cam via an L-shaped link (not shown) in operative engagement with the cam profile of the forward precision cam. The forward precision cam is linked to the trunnion shaft of trunnion 12 so as to transmit axial motion of trunnion 12 to I-shaped link lever 39 and to feedback the gyration angle of power roller 8 to I-shaped link lever 39. Thus, in the forward running mode, (e.g., in the D range), the degree of progress for ratio changing is mechanically fed back to the hydraulic servo mechanism via the forward precision cam. The forward ratio control system operates as follows.

When shifting the one end of I-shaped link lever 39 responsively to the ratio command signal by means of the step motor, the central portion of I-shaped link lever 39 also shifts, and thus spool 37a shifts from an initial spool position shown in FIG. 3 in either of axial directions of spool 37a based on the ratio command signal. The axial displacement of spool 37a establishes fluid communication between the main circuit 34 and one of output circuits 40 and 41 of forward ratio control valve 37, so as to deliver line pressure $P_L$ from main circuit 34 via forward ratio control valve 37 to the one output circuit. At the same time, the other output circuit is drained. This causes a differential pressure between the hydraulic pressures in output circuits 40 and 41, that is, a differential pressure between the hydraulic pressures in output circuits 42 and 43 of forward/reverse changeover valve 33. By way of the differential pressure between the hydraulic pressure output from output circuit 42 and applied to one side of servo piston 13 and the hydraulic pressure output from output circuit 43 and applied to the other side of servo piston 13 during the forward running mode, servo piston 13 shifts from its neutral position in such a manner as to progress or advance ratio-changing operation toward the desired transmission ratio corresponding to the transmission-ratio command signal value for the forward running mode. The degree of progress for ratio changing is fed back to the other end of I-shaped link lever 39 via the forward precision cam, to execute a so-called stroke control according to which servo piston 13 is returned to its neutral position in response to the degree of progress of the ratio changing operation. When the actual transmission ratio reaches the desired transmission ratio corresponding to the transmission-ratio command signal value during the stroke control, spool 37a becomes returned to the initial spool position shown in FIG. 3 at which fluid communication between main circuit 34 and each of output circuits 40 and 41 is blocked, thereby maintaining the desired transmission ratio corresponding to the transmission-ratio command signal value.

On the other hand, reverse ratio control valve 38 executes the ratio-changing operation suited to the reverse running mode instead of the forward-running-mode ratio-changing operation executed by forward ratio control valve 37. As discussed above, during the reverse running mode (during reverse rotation of countershaft 15), spool 33a of forward/reverse changeover valve 33 is kept at the retracted position that spool 33a is retracted from the spring-loaded position shown in FIG. 3, thus establishing fluid communication between ports 33c and 33d, and simultaneously switching from fluid communication between circuits 42 and 40 to fluid communication between output circuits 42 and 44, and simultaneously switching from fluid communication between circuits 43 and 41 to fluid communication between circuits 43 and 45. As shown in FIG. 3, reverse control valve 38 includes a spool 38a and an L-shaped link (not shown). One end of the L-shaped link is mechanically linked to spool 38a. The other end of the L-shaped link is in operative engagement with the cam profile of a reverse precision cam. In the reverse running mode, (e.g., in the R range), the degree of progress for ratio changing is mechanically fed back to the hydraulic servo mechanism via the reverse precision cam. The reverse ratio control system operates as follows.

During the reverse running mode (during reverse rotation of countershaft 15), spool 38a is shifted in either of axial directions of spool 38a based on the ratio command signal via the reverse precision cam so that the actual transmission ratio is brought closer to the desired transmission ratio corresponding to a predetermined fixed transmission-ratio command signal value (a predetermined low-speed gear ratio command signal value) suited to the reverse running mode. The stroke of spool 38a establishes fluid communication between sub circuit 35 and either one of output circuits 44 and 45 (that is, either one of output circuits 42 and 43) via sub circuit 48, so as to deliver line pressure $P_L$ from sub circuit 35 via reverse ratio control valve 38 to the one output circuit, and simultaneously to drain the hydraulic pressure in the other output circuit. This causes a differential pressure between the hydraulic pressures in output circuits 44 and 45, that is, a differential pressure between the hydraulic pressures in output circuits 42 and 43. By way of the differential pressure between the hydraulic pressure output from output circuit 42 and applied to one side of servo piston 13 and the hydraulic pressure output from output circuit 43 and applied to the other side of servo piston 13, servo piston 13 shifts from its neutral position in such a manner as to progress or advance ratio-changing operation toward the desired transmission ratio corresponding to the fixed transmission-ratio command signal value for the reverse running mode. The degree of progress for ratio changing is fed back to the L-shaped link lever via the reverse precision cam, to execute the stroke control according to which servo piston 13 is returned to its neutral position in response to the degree of progress of the ratio changing operation. When the actual transmission ratio reaches the desired transmission ratio corresponding to the fixed transmission-ratio command signal value suited to the reverse running mode during the stroke control, spool 38a becomes returned to the initial spool position shown in FIG. 3 at which fluid communication between sub circuit 48 and each of output circuits 44 and 45 is blocked, thereby maintaining the desired transmission ratio corresponding to the fixed transmission-ratio command signal value (the predetermined low-speed gear ratio command signal value) suited to the reverse running mode.

Forward/reverse changeover valve 33 is designed so that its valve spool 33a is permanently biased in the spring-loaded position (the axially downward position) by way of the spring bias of return spring 33b, thereby normally establishing fluid communication between output circuit 42 of forward/reverse changeover valve 33 and output circuit 40 of forward ratio control valve 37 and fluid communication between output circuit 43 of forward/reverse changeover valve 33 and output circuit 41 of forward ratio control valve 37. With forward/reverse changeover valve spool 33a kept at the spring-loaded position, the ratio changing control suited to the forward running mode is enabled via forward ratio control valve 37, while the ratio changing control suited to the reverse running mode is disabled. During the forward running mode, fluid communication between two ports 33c and 33d is blocked by way of the uppermost land of spool 33a, and whereby there is no supply of line pressure $P_L$ from sub circuit 35 through ports 33c and 33d, and sub circuit 48 into reverse ratio control valve 38, thus inhibiting the reverse-running-mode ratio-changing operation from being wastefully erroneously executed by reverse ratio control valve 38, during the forward running mode. Conversely, during the reverse running mode (during reverse rotation of countershaft 15), spool 33a of forward/reverse changeover valve 33 is kept at the retracted position (the reverse operating mode position) by means of reverse sensor 56, so as to establish fluid communication between circuits 42 and 44 and fluid communication between circuits 43 and 45. In addition to the above, with spool 33a held at the retracted position, fluid communication between ports 33c and 33d is established, thus enabling line pressure $P_L$ to be supplied from sub circuit 35 through sub circuit 48 to reverse ratio control valve 38. Thus, with forward/reverse changeover valve spool 33a kept at the retracted position, the ratio changing control suited to the reverse running mode is enabled via reverse ratio control valve 38. As previously described, reverse sensor 56 is mechanically linked to countershaft 15 to cause axial movement of spool 33a of forward/reverse changeover valve 33 towards the retracted position against the spring bias of return spring 33b in response to reverse rotation of countershaft 15. In other words, reverse sensor 56 contains moving parts. Therefore, lubricating oil is delivered from sub circuit 48 via a check valve 49 to reverse sensor 56, in particular during the reverse running mode, for lubrication of moving parts of reverse sensor 56. An excessive drop in line pressure $P_L$ in sub circuit 48 may exert a bad influence on the accuracy of the reverse-running-mode ratio changing control executed by reverse ratio control valve 38. Thus, an opening pressure of check valve 49 is set to a pressure level that never results in an excessive drop in line pressure $P_L$ in sub circuit 48.

In the toroidal CVT of the embodiment, pump pressure discharge circuit 32 of secondary oil pump 22 is branched at its downstream end into two branched lines. A first branch line of the branched lines of discharge circuit 32 is fluidly connected via a check valve 51 to sub circuit 35 of the ratio-change-control hydraulic circuit. A relief valve 50 is connected to discharge circuit 32 near discharge port 30 of secondary oil pump 22, to prevent the internal pressure in discharge circuit 32 from exceeding an opening pressure (a set pressure) of relief valve 50. In addition to check valve 51 disposed in the first branch line of discharge circuit 32, a check valve 52 is disposed in sub circuit 35 near the junction between the first branch line of discharge circuit 32 and sub circuit, 35, so as to prevent the pressurized working fluid, which is discharged from primary oil pump 21 and regulated by hydraulic pressure circuit 36, from flowing through sub circuit 35 toward secondary oil pump 22, and simultaneously to prevent the pressurized working fluid, which is discharged from secondary oil pump 22, from flowing through the first line of discharge circuit 32 toward primary oil pump 21. On the other hand, the second branch line of the branched lines of discharge circuit 32 is fluid connected to a power-roller lubrication circuit 53 via a check valve 54. Power-roller lubrication circuit 53 leads at its downstream end to lubricated portions of power roller 8. Each of check valves 51 and 52 has only to check back-flow. To avoid excessively high fluid-flow resistance of the check valve, the opening pressure of each of check valves 51 and 52 is set to as low a pressure level as possible. On the other hand, the opening pressure (set pressure) of check valve 54 is set to be higher than that of each of check valves 51 and 52 and lower than that of relief valve 50.

In the toroidal CVT of the embodiment, as clearly shown in FIG. 3, a leaf spring (a leaf-spring shaped biasing device or a leaf-spring shaped biasing means) 55 is operatively disposed in low-pressure piston chamber 18L of servo piston 13, to bias servo piston 13 to a position substantially corresponding to the neutral position in a direction that the down-stroke (viewing FIG. 3) of servo piston 13 occurs and thus the volumetric capacity of high-pressure piston chamber 18H narrows. Biasing means 55 functions to prevent the offset or upstroke (viewing FIG. 3) of servo piston 13 from its neutral position, which may occur owing to hauling in the forward direction of the vehicle in the stopped state of the prime mover in which there is no hydraulic pressure produced by the prime-mover driven oil pump (primary oil pump 21). As is generally known, in the forward running mode, an upshift occurs when the hydraulic pressure in high-pressure piston chamber 18H becomes higher than that in low-pressure piston chamber 18L to create a differential pressure between both sides of each servo piston. However, as a result of the previously-noted upstroke of servo piston 13 from its neutral position, occurring owing to hauling in the vehicle forward direction, such an upshift tends to occur undesirably. That is to say, preventing the offset or upstroke (viewing FIG. 3) of servo piston 13 from its neutral position, which may occur owing to hauling in the vehicle forward direction, by means of leaf spring 55 means preventing an upshift of the CVT transmission to a higher transmission ratio. As appreciated from the above, leaf spring (biasing means) 55 serves as a forward-running-mode high-ratio starting prevention biasing means that prevents an undesirable upshift of the toroidal CVT to a higher transmission ratio during hauling in the vehicle forward direction.

Details of the ratio-changing operation performed by the toroidal CVT of the embodiment are hereunder described.

During the forward running mode in the D range, countershaft 15 rotates in the normal-rotational direction, and thus reverse sensor 56 detects normal rotation of countershaft 15. As a result, forward/reverse changeover valve 33 is kept at the spring-loaded position (forward position) shown in FIG. 3. Under this condition, line pressure $P_L$ from main circuit 34 is used as an initial pressure so as to perform the forward ratio-changing control by way of forward ratio control valve 37. In contrast to the above, during the reverse running mode in the R range, countershaft 15 rotates in the reverse-rotational direction, and thus reverse sensor 56 detects reverse rotation of countershaft 15. As a result, forward/reverse changeover valve 33 is kept at the retracted position (reverse position). Under this condition, line pressure $P_L$ from sub circuits 35 and 48 is used as an initial pressure so as to perform the reverse ratio-changing control by way of reverse ratio control valve 38. During ratio changing operation in the reverse running mode, working fluid flow from sub circuit 35 toward secondary oil pump 22 is checked or blocked by means of check valve 51, and there is less leakage of the pressurized working fluid from sub circuit 35 toward secondary oil pump 22 and thus line pressure $P_L$ from sub circuits 35 and 48 can be effectively used as the initial pressure needed to perform the reverse ratio-changing control.

When the engine is in the stopped state, there is no discharge of working fluid from primary oil pump 21 having a driven connection with engine 1. In this case, there is no supply of line pressure $P_L$ from main circuit 34 to forward ratio control valve 37 and also there is no supply of line pressure $P_L$ from sub circuits 35 and 48 to reverse ratio control valve 38. Therefore, in the stopped state of engine 1, it is impossible to perform the forward ratio-changing control via forward ratio control valve 37 and the reverse ratio-changing control via reverse ratio control valve 38, using the pressurized working fluid generated from primary oil pump 21.

As discussed above, there is a possibility that torque flows backwards from road wheels to the output disk of the toroidal CVT owing to hauling or coasting even in the engine stopped state. In such a case, countershaft 15, which is permanently connected to axle driveshafts of the road wheels, drives eccentric cam 24 of secondary oil pump 22. Secondary oil pump 22 incorporated in the ratio-changing-control hydraulic circuit of the toroidal CVT of the embodiment is comprised of a radial plunger pump having eccentric cam 24 and radial plunger 26. In other words, secondary oil pump 22 is a reversible oil pump. Thus, secondary oil pump 22 functions to discharge pressurized working fluid into discharge circuit 32, when eccentric cam 24 is rotated in either of two opposite rotation directions due the torque transmitted to countershaft 15. The hydraulic pressure of pressurized working fluid from secondary oil pump 22 varies depending on a rotational speed of eccentric cam 24.

When the road wheels rotate in their reverse-rotational directions in the engine stopped state, spool 33a of forward/reverse changeover valve 33 is shifted to the retracted position, and thus fluid communication between ports 33c and 33d is established. As a result, the discharge pressure from secondary oil pump 22 is fed from the first branch line of discharge circuit 32 through check valve 51, ports 33c and 33d, and sub circuit 48 to reverse ratio control valve 38. In such a case, that is, in the presence of reverse rotation of countershaft 15 in the engine stopped state, the discharge pressure delivered from secondary oil pump 22 through sub circuit 48 to reverse ratio control valve 38 is used as an initial pressure needed to perform the reverse ratio-changing control by way of reverse ratio control valve 38, and whereby the transmission ratio of the toroidal CVT can be maintained at the desired transmission ratio corresponding to the predetermined fixed transmission-ratio command signal value (the predetermined low-speed gear ratio command signal value) suited to the reverse running mode.

Assuming that a drop in the discharge pressure from secondary oil pump 22 occurs owing to a fall in reverse-rotational speed of countershaft 15 during reverse-rotation of the road wheels in the engine stopped state, there is a possibility that reverse ratio control valve 38 performs the reverse ratio-changing control satisfactorily due to a lack in the discharge pressure. In the presence of such a lack of the discharge pressure, back torque from the road wheels to the output disk tends to cause a slight offset of trunnion 12 from its neutral position in the trunnion-axis direction indicated by the arrow ε (see FIG. 3) that up-shifts the toroidal CVT to a higher transmission ratio. The slight offset of trunnion 12 from the neutral position in the trunnion-axis direction indicated by the arrow ε, in other words, the upshift tendency is mechanically fed back to the hydraulic servo mechanism, that is, spool 38a of reverse ratio control valve 38. That is, spool 38a is shifted in the axial direction indicated by the arrow ρ in FIG. 3, in response to the slight trunnion offset mechanically fed back. Thus, output circuit 44 is communicated with a drain port 38b and simultaneously sub circuit 48 is communicated with output circuit 45, so that the discharge pressure from secondary oil pump 22 is fed through sub circuit 48 to output circuit 45. Thus, the internal pressure in high-pressure piston chamber 18H rises while the internal pressure in low-pressure piston chamber 18L drops. As a consequence, the down-stroke of servo piston 13 in the trunnion-axis direction indicated by the arrow ε is effectively prevented, and thus the offset of trunnion 12 from the neutral position, that is, the previously-noted upshift tendency, is prevented, even if there is a lack of the discharge pressure. When servo piston 13 is further pushed and moved up against the spring bias of leaf spring 55 owing to the rise in internal pressure in high-pressure piston chamber 18H and the drop in internal pressure in low-pressure piston chamber 18L, trunnion 12 passes through the neutral position and further axially shifts in the opposite direction to the trunnion-axis direction indicated by the arrow ε (see FIG. 3). In such a case, a downshift occurs even during reverse-rotation of the road wheels in the engine stopped state.

As discussed previously, even if the road wheels rotate in their reverse-rotational directions owing to hauling or coasting in the engine stopped state, according to the ratio change control system of the embodiment, it is possible to maintain the actual transmission ratio of the toroidal CVT at the predetermined fixed transmission-ratio command signal value for reverse ratio control valve 38 that executes the ratio-changing operation suited to the reverse running mode.

Additionally, during operation of secondary oil pump 22, undesirable working fluid flow from the first branch line of discharge circuit 32 through sub circuit 35 toward primary oil pump (prime-mover driven oil pump) 21 can be prevented or blocked by means of check valve 52. This insures the previously-noted high-ratio starting prevention function.

Conversely when the road wheels rotate in their normal-rotational directions in the engine stopped state, spool 33a of forward/reverse changeover valve 33 is kept at the spring-loaded position shown in FIG. 3, and thus fluid communication between ports 33c and 33d is blocked. Thus, there is no supply of the discharge pressure from secondary oil pump 22 through the first branch line of discharge circuit 32, check valve 51, ports 33c and 33d, and sub circuit 48 to reverse ratio control valve 38. In this case, there is no supply of the hydraulic pressure to forward ratio control valve 37. Two piston chambers 18H and 18L defined on both sides of servo piston 13 are held at their non-pressure states. In the non-pressure states of piston chambers 18H and 18L, the piston-stroke position of servo piston 13 is determined by means of leaf-spring biasing means 55. That is, leaf-spring biasing means 55 serves to bias servo piston 13 to a position substantially corresponding to the neutral position, and whereby the undesirable up-stroke of servo piston 13 from the neutral position is prevented. Thus it is possible to avoid an undesired upshift of the toroidal CVT to a higher transmission ratio, which may occur when the road wheels rotate in their normal-rotational directions owing to hauling or coasting in the engine stopped state, and consequently to avoid the "high-ratio starting".

As will be appreciated from the above, in the toroidal CVT of the embodiment, even if the road wheels rotate in either of the normal-rotational direction and the reverse-rotational direction owing to hauling or coasting in the engine stopped state, there is no risk of the toroidal CVT's upshifting to a higher transmission ratio, thus avoiding the "high-ratio starting".

In addition to the above, the transmission-ratio change control system of the toroidal CVT of the embodiment acts to inhibit the hydraulic pressure (the discharge pressure) from secondary oil pump 22 from being supplied to forward ratio control valve 37, and to permit the hydraulic pressure (the discharge pressure) from secondary oil pump 22 to be supplied to only the reverse ratio control valve 38. That is, the ratio change control system of the toroidal CVT of the embodiment is designed to prevent oil leakage from forward ratio control valve 37 during operation of secondary oil pump 22, thereby preventing working fluid from being wastefully consumed. This contributes to down-sizing of secondary oil pump 22, that is, reduced cost and efficient use of the limited space of the toroidal CVT.

The lubricating action of power-roller lubrication circuit 53 is hereunder described in detail.

When engine 1 is in the operative state and thus primary oil pump 21 is driven by engine 1, line pressure $P_L$ in main circuit 34 and sub circuit 35 is produced. Line pressure $P_L$, used as an initial pressure needed to perform the forward ratio-changing control, is a relatively high pressure level as compared to the discharge pressure created by secondary oil pump 22. Therefore, even in case that there is an output of discharge pressure from secondary oil pump 22 to discharge circuit 32 in the vehicle running state, line pressure $P_L$ (of the relatively high pressure) in sub circuit 35 overcomes the discharge pressure from secondary oil pump 22. That is to say, line pressure $P_L$ acts to hold check valve 51 at its fully-closed state. Under these conditions, the discharge pressure from secondary oil pump 22 acts to open check valve 54 disposed in the second branch line of discharge circuit 32. As a result of this, working fluid (traction oil) can be supplied to the lubricated portions of power roller 8.

During a time period that the road wheels rotate in their normal-rotational directions in the engine stopped state, the flow of pressurized working fluid, which is discharged from secondary oil pump 22 into discharge circuit 32, is blocked by means of check valve 52 and also blocked by means of forward/reverse changeover valve 33 whose spool is held at the spring-loaded position (the forward operating mode position shown in FIG. 3). As a result, the hydraulic pressure of pressurized working fluid, discharged from secondary oil pump 22 into discharge circuit 32, gradually rises and reaches the opening pressure of check valve 54 disposed in power-roller lubrication circuit 53. Thereafter, as soon as the hydraulic pressure in discharge circuit 32 exceeds the opening pressure of check valve 54, check valve 54 is opened, and thus the pressurized working fluid in discharge circuit 32 is delivered to the lubricated portions of power roller 8.

On the other hand, during a time period that the road wheels rotate in their reverse-rotational directions in the engine stopped state, the flow of pressurized working fluid, which is discharged from secondary oil pump 22 into discharge circuit 32, is blocked by means of check valve 52 and also blocked by piston chambers 18H and 18L after the high-ratio starting prevention function has been completed.

As a result, the hydraulic pressure of pressurized working fluid, discharged from secondary oil pump 22 into discharge circuit 32, gradually rises and reaches the opening pressure of check valve 54 disposed in power-roller lubrication circuit 53. Thereafter, as soon as the hydraulic pressure in discharge circuit 32 exceeds the opening pressure of check valve 54, check valve 54 is opened, and thus the pressurized working fluid in discharge circuit 32 is delivered to the lubricated portions of power roller 8.

In this manner, when the road wheels rotate owing to hauling or coasting even in the engine stopped state, it is possible to effectively lubricate power roller 8 by using part of the pressurized working fluid from secondary oil pump 22 as lubricating oil for power roller 8. This enhances the durability of power roller 8. In the event that the hydraulic pressure in discharge circuit 32 further rises and exceeds the opening pressure (the set pressure) of relief valve 50 while part of the pressurized working fluid from secondary oil pump 22 is used as lubricating oil for power roller 8, relief valve 50 is opened and thus the working fluid in discharge circuit 32 is drained back to the oil reservoir (or the oil pan), thereby avoiding the excessively high pressure working fluid from exerting a bad influence on hydraulic component parts.

Figure 4:
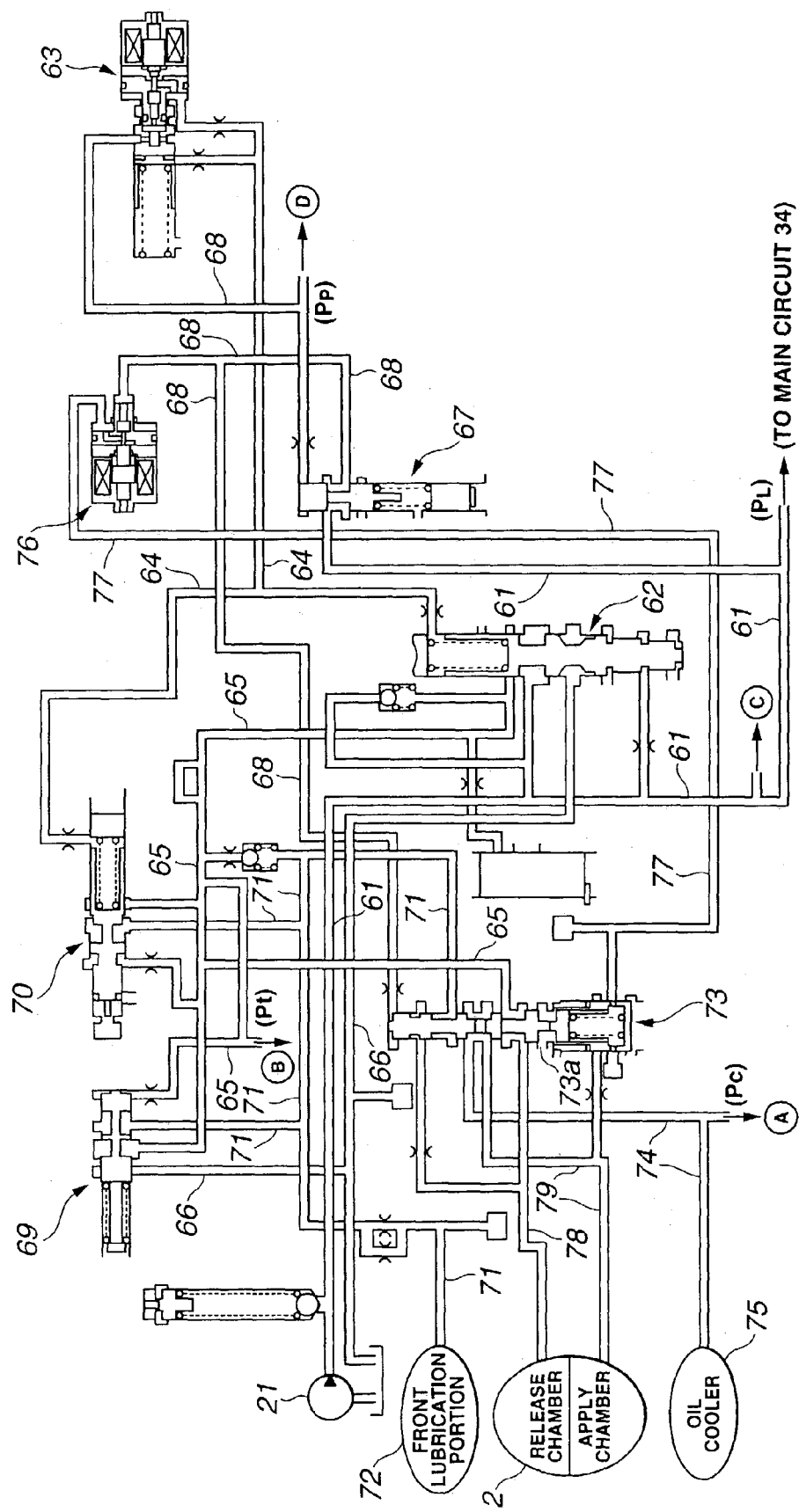
FIG. 4 is a hydraulic circuit diagram showing a detailed structure of a hydraulic control circuit included in the hydraulic system of FIG. 3.

Referring now to FIG. 4, there is shown the detailed structure of hydraulic control circuit 36 included in the hydraulic control system of FIG. 3.

As clearly shown in FIG. 4, the pressurized working fluid from primary oil pump (prime-mover driven oil pump) 21 is discharged into a line pressure circuit 61. A pressure regulator valve 62 acts to regulate the hydraulic pressure of pressurized working fluid in line pressure circuit 61 to a predetermined line pressure $P_L$. As discussed above, to use the predetermined line pressure $P_L$ as an initial pressure needed to perform the ratio-changing control, line pressure $P_L$ is output into main circuit 34. Pressure regulator valve 62 functions to regulate or modulate the pressure level of line pressure $P_L$ to a pressure level that is determined based on a line-pressure control pressure in a circuit 64. The line-pressure control pressure is generated by means of a line pressure solenoid valve 63 (described later). During the line pressure control, pressure regulator valve 62 also functions to direct surplus working fluid of line pressure circuit 61 into a torque converter pressure circuit 65. In the case that the amount of surplus working fluid of line pressure circuit 61 excessively increases, the surplus working fluid is exhausted through pressure regulator 62 via a suction circuit 66 as well as torque converter pressure circuit 65. A pilot valve 67 receives or inputs line pressure $P_L$ via line pressure circuit 61, and reduces the line pressure to a predetermined constant pilot pressure $P_P$ to output pilot pressure $P_P$ to a pilot pressure circuit 68. Pilot pressure $P_P$ is used as an initial pressure for line pressure solenoid valve 63. By way of duty cycle control, line pressure solenoid 63 serves to create the line-pressure control pressure from the pilot pressure (the initial pressure), and to output the line-pressure control pressure into circuit 64. By means of both of a torque converter regulator valve 69 and a lock-up regulator valve 70, the hydraulic pressure of surplus working fluid flowing from pressure regulator 62 to torque converter pressure circuit 65 is controlled to a predetermined torque converter pressure Pt based on the line-pressure control pressure, which is fed through circuit 64 and acts on spring-loaded spool ends of pressure regulator valve 62 and lock-up regulator valve 70. The upper limit of torque converter pressure Pt is set or limited to a predetermined pressure level by means of torque converter regulator valve 69. Additionally, the lower limit of torque converter pressure Pt is set or limited to a predetermined pressure level equivalent to the lowest line pressure by means of lock-up regulator valve 70. During the hydraulic pressure control to predetermined torque converter pressure Pt, part of surplus working fluid flowing out of torque converter regulator valve 69 and lock-up regulator valve 70 is further directed or routed through a circuit 71 to a front lubrication portion 72 of the toroidal CVT for lubrication. As described later, a portion of the surplus working fluid flowing out of torque converter regulator valve 69 and lock-up regulator valve 70 is modulated and used as a hydraulic pressure in a cooling-and-lubricating circuit, such as a cooler pressure $P_C$. At the same time, part of surplus working fluid flowing out of torque converter regulator valve 69 and lock-up regulator valve 70 is further directed or routed to a lock-up control valve 73. Depending on the valve position of lock-up control valve 73 whose spool is moved between a converter position (described later) and a lock-up position (described later), it is possible to direct part of surplus working fluid via a cooling circuit 74 to an oil cooler 75 in which the working fluid is cooled. The spool stroke position of lock-up control valve 73 is controlled by means of a lock-up solenoid valve 76, as described hereunder.

When lock-up solenoid valve 76 is energized (ON), pilot pressure $P_P$ is output from pilot pressure circuit 68 via lock-up solenoid valve 76 to a circuit 77, and as a result the spool of lock-up control valve 73 is held at the converter position shown in FIG. 4. Conversely when lock-up solenoid valve 76 is deenergized (OFF), pilot pressure $P_P$ is drained from circuit 77, and as a result the spool of lock-up control valve 73 is held at the lock-up position or the lowermost valve position (viewing FIG. 4).

When the spool of lock-up control valve 73 is held at the converter position shown in FIG. 4, the working fluid in torque converter pressure circuit 65, controlled to torque converter pressure Pt, flows through a circuit 78 into a release chamber of torque converter 2, and then flows out of an apply chamber of torque converter 2. Thereafter, the working fluid flowing out of the torque-converter apply chamber is directed through a circuit 79 via a cooling circuit 74 to oil cooler 75, so as to produce a cooler pressure $P_C$ in cooling circuit 74. With lock-up control valve 73 held at the converter position, the working fluid of torque converter pressure Pt flows from the torque-converter release chamber to the torque-converter apply chamber, and thus torque converter 2 achieves power transmission in the torque-converter state that the lock-up function is disabled.

Conversely when the spool of lock-up control valve 73 is held at the lock-up position or the lowermost valve position that the spool has been shifted downwards from the spring-loaded position shown in FIG. 4, the working fluid in torque converter pressure circuit 65, controlled to torque converter pressure Pt, flows through circuit 79 into the torque-converter apply chamber, and then flows out of the torque-converter release chamber. Thereafter, the working fluid flowing out of the torque-converter release chamber is drained or exhausted through circuit 78 via a drain port 73a. With lock-up control valve 73 held at the lock-up position, the working fluid of torque converter pressure Pt flows from the torque-converter apply chamber to the torque-converter release chamber, and thus torque converter 2 achieves power transmission in the lock-up state that the lock-up function is enabled. During a period of time when the lock-up clutch of torque converter 2 is engaged, part of surplus working fluid in circuit 71 is directed or routed through cooling circuit 74 to oil cooler 75 so as to produce cooler pressure $P_C$ in cooling circuit 74. Therefore, it is possible to cool the working fluid flowing in hydraulic control circuit 36 in the lock-up state as well as the torque-converter state.

As the hydraulic pressure (hereinafter is referred to as "plunger retracted-position holding pressure") to be supplied to plunger retracting chamber 23 for holding radial plunger 26 of secondary oil pump 22 at the retracted position (see FIG. 2C) at which radial plunger 26 is positioned to be spaced apart from the cam contour surface of eccentric cam 24, and constantly produced by primary oil pump 21 (the prime mover driven oil pump) during operation of the prime mover (engine 1), the toroidal CVT of the embodiment uses either one of four sorts of hydraulic pressures $P_C$, Pt, $P_L$, and $P_P$ (see FIG. 4). Concretely, as the plunger retracted-position holding pressure, any one of cooler pressure $P_C$ in cooling circuit 74, torque converter pressure Pt in torque converter pressure circuit 65, line pressure $P_L$ in line pressure circuit 61, and pilot pressure $P_P$ in pilot pressure circuit 68 can be used. More concretely, in the secondary oil pump structure shown in FIGS. 2A–2C, either one of outlet ports indicated by A, B, C, and D in the hydraulic circuit diagram of FIG. 4 is fluidly connected to plunger retracting chamber 23 shown in FIGS. 2A–2C.

With the previously-discussed arrangement, in the stopped state of engine 1, there is no supply of pressurized working fluid from primary oil pump (the prime-mover driven oil pump) 21, and thus neither of cooler pressure $P_C$, torque converter pressure Pt, line pressure $P_L$, and pilot pressure $P_P$ can be produced. Thus, there is no supply of the plunger retracted-position holding pressure to plunger retracting chamber 23 (see FIGS. 2A–2B), and therefore radial plunger 26 of secondary oil pimp 22 is kept in contact with the cam contour surface of eccentric cam 24 by means of return spring 27. Under these conditions, when the road wheels rotate owing to hauling or coasting in the engine stopped state, eccentric cam 24 is rotated in response to rotation of the road wheel, and as a result the reciprocating motion of radial plunger 26 is created and the discharge and suction strokes shown in FIGS. 2A and 2B are repeated so as to provide the pumping action of secondary oil pump 22. As previously described, by virtue of pumping action of secondary oil pump 22, the high-ratio starting can be prevented or avoided.

On the contrary, during operation of the prime mover (engine 1), the prime-mover-driven oil pump (primary oil pump 21) is driven and the pressurized working fluid is discharged from primary oil pump 21, thereby producing cooler pressure $P_C$, torque converter pressure Pt, line pressure $P_L$, and pilot pressure $P_P$. The plunger retracted-position holding pressure (corresponding to either of pressures $P_C$, Pt, $P_L$, and $P_P$) is supplied to plunger retracting chamber 23. As a result, during operation of engine 1, as shown in FIG. 2C, radial plunger 26 of secondary oil pump 22 is retracted and positioned to be spaced apart from the cam contour surface of eccentric cam 24. For the reason discussed above, during operation of engine 1 radial plunger 26 of secondary oil pump 22 is not driven by eccentric cam 24 that is rotated in response to input rotation transmitted from the road wheels to countershaft 15. That is, even when eccentric cam 24 is rotated in response to input rotation transmitted from the road wheels to countershaft 15 during operation of engine 1, secondary oil pump 22 can be held at the inoperative state.

As explained above, when the vehicle is in the normal running state during operation of engine 1, secondary oil pump 22 (output-rotation driven pump) can be held at the inoperative state, thus avoiding secondary oil pump 22 from being wastefully driven during operation of engine 1 and consequently reducing the running resistance, in other words, fuel consumption.

For instance, when cooler pressure $P_C$ in cooling circuit 74 is used as the previously-discussed plunger retracted-position holding pressure, that is constantly produced during operation of the prime mover (engine 1), that is, during primary oil pump 21, the working fluid of cooler pressure $P_C$ can be rapidly drained when primary oil pump 21 is shifted to the stopped state. The use of cooler pressure $P_C$ is superior in enhanced operational response of secondary oil pump 22, and also enhances the accuracy of ratio changing control.

When torque converter pressure Pt in torque converter pressure circuit 65 is used as the previously-discussed plunger retracted-position holding pressure, the upper limit of torque converter pressure Pt is set or limited to the predetermined pressure level by means of torque converter regulator valve 69. Additionally, the lower limit of torque converter pressure Pt is set or limited to the predetermined pressure level equivalent to the lowest line pressure by means of lock-up regulator valve 70. Therefore, when shifting and holding radial plunger 26 of secondary oil pump 22 to and at the retracted position (see FIG. 2C), the use of torque converter pressure Pt is superior in stability, reliability and accuracy of axial position control of secondary-oil-pump radial plunger 26. In addition to the above, torque converter pressure Pt never exceeds the maximum line pressure, and therefore the use of torque converter pressure Pt is superior in increased durability of the hydraulic control system.

When line pressure $P_L$ in line pressure circuit 61 is used as the previously-discussed plunger retracted-position holding pressure, line pressure $P_L$ is the initial pressure needed to perform the ratio-changing control and thus line pressure $P_L$ is relatively high. Therefore, when shifting and holding radial plunger 26 of secondary oil pump 22 to and at the retracted position (see FIG. 2C), the use of line pressure $P_L$ is superior in stability, reliability and accuracy of axial position control of secondary-oil-pump radial plunger 26. As described previously, line pressure $P_L$, which is used as the initial pressure, is relatively high, and therefore the use of line pressure $P_L$ contributes to down-sizing of a pressure-receiving surface area of plunger retracting chamber 23, that is, down-sizing and lightening of secondary oil pump (output-rotation driven pump) 22.

When pilot pressure $P_P$ in pilot pressure circuit 68 is used as the previously-discussed plunger retracted-position holding pressure, pilot pressure $P_P$ is adjusted to the predetermined constant pressure value. Therefore, when shifting and holding radial plunger 26 of secondary oil pump 22 to and at the retracted position (see FIG. 2C), the use of pilot pressure $P_P$ is superior in stability, reliability and accuracy of axial position control of secondary-oil-pump radial plunger 26.

As set forth above, according to the secondary oil pump structure shown in FIGS. 2A–2C, in holding secondary oil pump 22 at the inoperative state during operation of engine 1 (during operation of primary oil pump), by the use of either one of cooler pressure $P_C$, torque converter pressure Pt, line pressure $P_L$, and pilot pressure $P_P$ as the plunger retracted-position holding pressure, and by holding radial plunger 26 of secondary oil pump 22 at the retracted position (the plunger inoperative position shown in FIG. 2C) at which radial plunger 26 is positioned to be spaced apart from the cam contour surface of eccentric cam 24, as shown in FIGS. 2A–2C, the plunger retracted-position holding pressure is introduced into plunger retracting chamber 23 that is defined in pump housing 25 in conjunction with the relatively large-diameter flanged end of radial plunger 26 (see FIGS. 2A–2C). In lieu thereof, the secondary oil pump may be constructed and modified as shown in FIGS. 5A–5C.

Figure 5A:
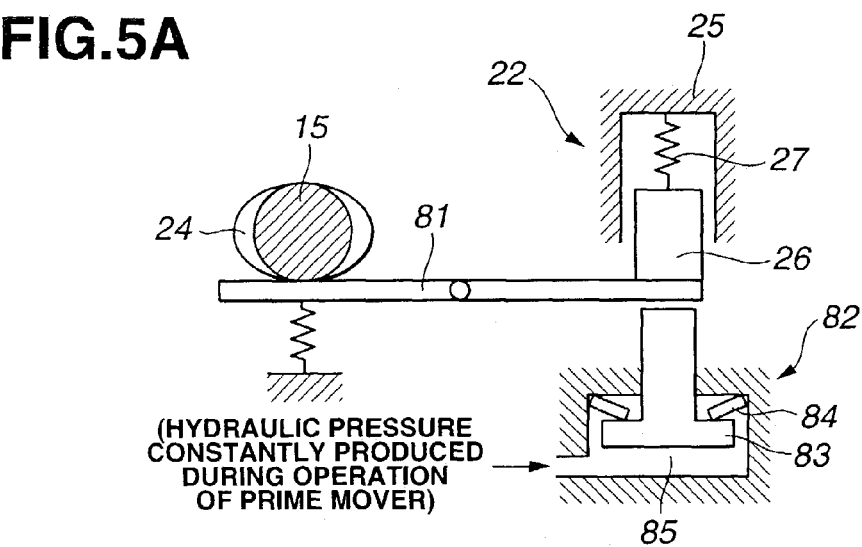
FIG. 5A is an enlarged longitudinal cross-sectional view illustrating an essential part of a first modified secondary oil pump that is incorporated within the toroidal CVT of the embodiment, and driven in response to rotation transferred from the road wheels to the transmission output shaft, and conditioned in a suction stroke.
Figure 5B:
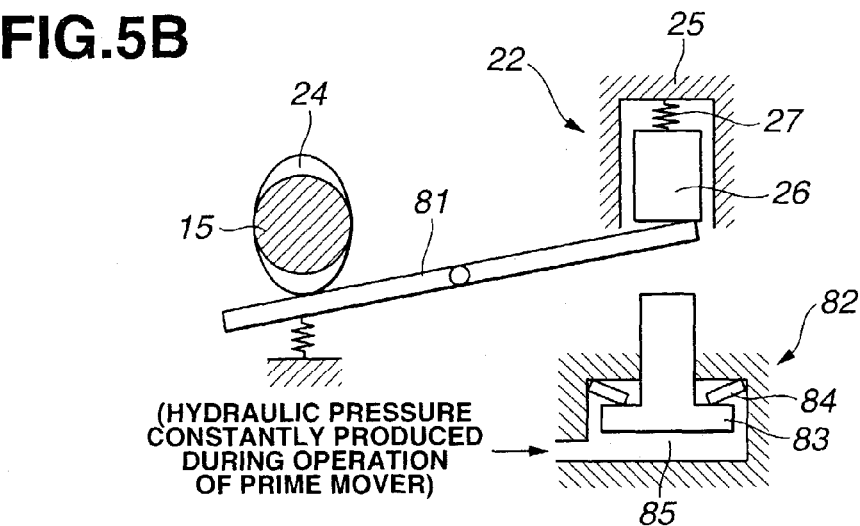
FIG. 5B is an enlarged longitudinal cross-sectional view illustrating an essential part of the first modified secondary oil pump that is conditioned in a discharge stroke.
Figure 5C:
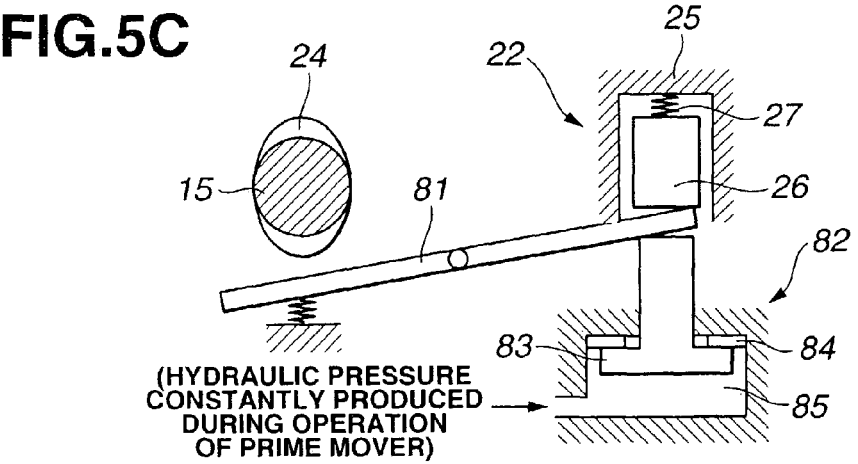
FIG. 5C is an enlarged longitudinal cross-sectional view illustrating an essential part of the first modified secondary oil pump that is kept in an inoperative state.

The first modified secondary oil pump 22 shown in FIGS. 5A–5C is similar to the secondary oil pump structure shown in FIGS. 2A–2C. Thus, reference signs used to designate elements in the pump shown in FIGS. 2A–2C will be applied to the corresponding elements used in the first modified secondary oil pump shown in FIGS. 5A–5C, for the purpose of comparison of the two different secondary oil pumps. The first modified secondary oil pump 22 shown in FIGS. 5A–5C has an I-shaped link mechanism 81 through which rotary motion of eccentric cam 24 is converted into a reciprocating motion of plunger 26. Also provided is an actuator 82 whose piston 83 is coaxially arranged with plunger 26. The central portion of I-shaped link mechanism 81 is pivotally mounted by means of a pivot pin (not numbered). One end (the right-hand end, viewing FIGS. 5A–5C) of I-shaped link mechanism 81 is interleaved in a space defined between the bottom end of plunger 26 and the upper end of actuator piston 83. The other end (the left-hand end, viewing FIGS. 5A–5C) of I-shaped link mechanism 81 is normally biased to the cam contour surface of eccentric cam 24 that is fixedly pin-connected to the front end of countershaft 15, by means of a spring (not numbered). Actuator 82 also includes a return spring 84 by means of which piston 83 is permanently biased in the direction that piston 83 moves apart from plunger 26 (see FIGS. 5A and 5B). In the pump structure of the first modified secondary oil pump shown in FIGS. 5A–5C, the actuator housing of actuator 82 defines therein a plunger retracting chamber 85 in conjunction with the lower relatively large-diameter flanged end of actuator piston 83. That is, in the pump structure of FIGS. 5A–5C, plunger retracting chamber 85 is defined in the actuator-piston chamber of actuator 82, instead of defining the same in the plunger chamber of secondary-oil-pump plunger 26. In the first modified secondary oil pump shown in FIGS. 5A–5C, either one of outlet ports indicated by A, B, C, and D in the hydraulic circuit diagram of FIG. 4 is connected to plunger retracting chamber 85 shown in FIGS. 5A–5C so as to introduce either one of hydraulic pressures $P_C$, Pt, $P_L$, and $P_P$ into plunger retracting chamber 85 during operation of the prime mover (engine 1).

With the arrangement of the first modified secondary oil pump shown in FIGS. 5A–5C, in the stopped state of engine 1, neither of cooler pressure $P_C$, torque converter pressure Pt, line pressure $P_L$, and pilot pressure $P_P$ can be produced. Thus, there is no supply of the plunger retracted-position holding pressure to plunger retracting chamber 85 (see FIGS. 5A–5B), and therefore actuator piston 83 is kept out of contact with each of the right-hand end of I-shaped link mechanism 81 without interfering with the bottom end of plunger 26, by means of the spring bias of return spring 84. Under these conditions, plunger 26 of secondary oil pump 22 is continually kept in contact with the cam contour surface of eccentric cam 24 via I-shaped link mechanism 81 by means of return spring 27. Thus, when the road wheels rotate owing to hauling or coasting in the engine stopped state, eccentric cam 24 is rotated in response to rotation of the road wheel, and as a result the reciprocating motion of plunger 26 is created and the discharge and suction strokes shown in FIGS. 5A and 5B are repeatedly executed so as to provide the pumping action of secondary oil pump 22. As previously described, by virtue of pumping action of secondary oil pump 22, the high-ratio starting can be prevented or avoided.

On the contrary, during operation of the prime mover (engine 1), the prime-mover-driven oil pump (primary oil pump 21) is driven and the pressurized working fluid is discharged from primary oil pump 21, thereby producing cooler pressure $P_C$, torque converter pressure Pt, line pressure $P_L$, and pilot pressure $P_P$. The plunger retracted-position holding pressure (corresponding to either of pressures $P_C$, Pt, $P_L$, and $P_P$) is supplied to plunger retracting chamber 85. As a result, during operation of engine 1, as shown in FIG. 5C, actuator piston 83 shifts to its protruded position (or the uppermost position) against the spring bias of return spring 84, and thus plunger 26 of secondary oil pump 22 is retracted via the right-hand end of I-shaped link mechanism 81. As a result, the left-hand end of I-shaped link mechanism 81 is brought out of contact with the cam contour surface of eccentric cam 24. For the reason discussed above, during operation of engine 1 plunger 26 of secondary oil pump 22 is not driven by eccentric cam 24 that is rotated in response to input rotation transmitted from the road wheels to countershaft 15. That is, even when eccentric cam 24 is rotated in response to input rotation transmitted from the road wheels to countershaft 15 during operation of engine 1, the first modified secondary oil pump 22 shown in FIGS. 5A–5C can be held at the inoperative state. Therefore, when the vehicle is in the normal running state during operation of engine 1, secondary oil pump 22 (output-rotation driven pump) can be held at the inoperative state, thus avoiding secondary oil pump 22 from being wastefully driven during operation of engine 1 and consequently reducing the running resistance, in other words, fuel consumption.

Figure 6A:
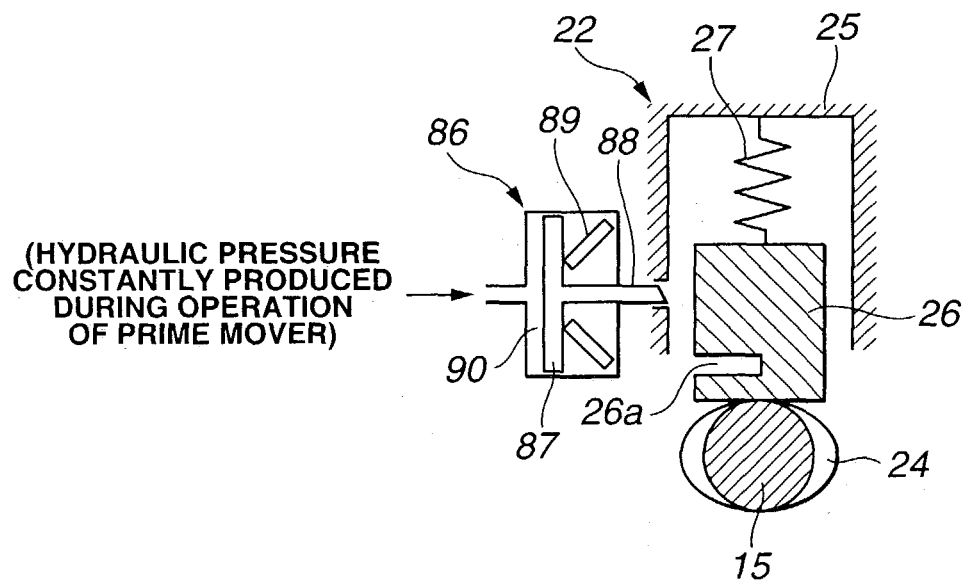
FIG. 6A is an enlarged longitudinal cross-sectional view illustrating an essential part of a second modified secondary oil pump that is kept in an operative state (during pumping operation).
Figure 6B:
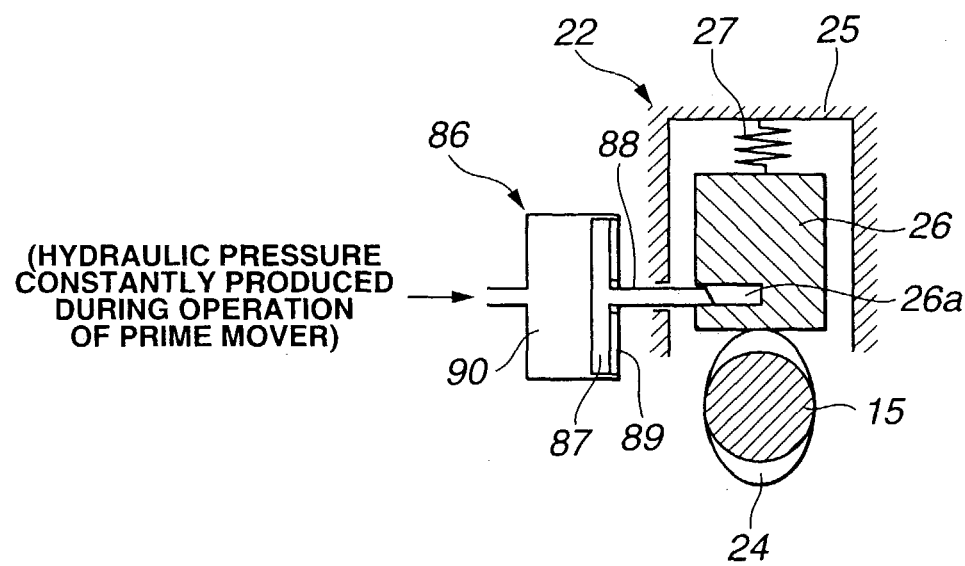
FIG. 6B is an enlarged longitudinal cross-sectional view illustrating an essential part of the second modified secondary oil pump that is kept in an inoperative state.

Referring now to FIGS. 6A and 6B, there is shown the second modified secondary oil pump that can be held in the inoperative state by holding plunger 26 of secondary oil pump 22 at the retracted position (see FIG. 6B) at which plunger 26 is positioned to be spaced apart from the cam contour surface of eccentric cam 24, by using either one of cooler pressure $P_C$, torque converter pressure Pt, line pressure $P_L$, and pilot pressure $P_P$ as the plunger retracted-position holding pressure during operation of engine 1. The second modified secondary oil pump 22 shown in FIGS. 6A–6B is similar to the pump structure of the first modified secondary oil pump shown in FIGS. 5A–5C. Thus, reference signs used to designate elements in the pump shown in FIGS. 5A–5C will be applied to the corresponding elements used in the second modified secondary oil pump shown in FIGS. 6A–6B, for the purpose of comparison of these different secondary oil pumps. The second modified secondary oil pump 22 shown in FIGS. 6A–6B has an actuator 86 arranged close to the side wall surface of the cylindrical plunger chamber of pump housing 25 that slidably accommodates plunger 26 therein. Actuator 86 is comprised of a hydraulically-operated, axially slidable piston 87 whose axis is perpendicular to the axis of plunger 26, and an interlocking pin (simply, a lock pin) 88 axially extending from and fixedly connected to the central portion of piston 87. A pin slot 26a is defined in plunger 26 such that the axis of pin slot 26a is perpendicular to the axis of plunger 26. Lock pin 88 is brought into engagement with pin slot 26a under a predetermined condition described later, so as to lock or hold plunger 26 of secondary oil pump 22 at the inoperative position (the retracted position) shown in FIG. 6B during operation of engine 1. Actuator has a return spring 89 that permanently forces or biases piston 87 in the direction that lock pin 88 is retracted into the piston chamber of piston 87 (see FIG. 6A). In the pump structure of the second modified secondary oil pump shown in FIGS. 6A–6B, the actuator housing of actuator 86 defines therein a plunger retracting chamber 90 in conjunction with the left-hand side, relatively large-diameter flanged end of actuator piston 87. That is, in the pump structure of FIGS. 6A–6B, plunger retracting chamber 90 is defined in the actuator-piston chamber of actuator 86, instead of defining the same in the plunger chamber of secondary-oil-pump plunger 26. In the second modified secondary oil pump shown in FIGS. 6A–6B, either one of outlet ports indicated by A, B, C, and D in the hydraulic circuit diagram of FIG. 4 is connected to plunger retracting chamber 90 shown in FIGS. 6A–6B so as to introduce either one of hydraulic pressures $P_C$, Pt, $P_L$, and $P_P$ into plunger retracting chamber 90 during operation of the prime mover (engine 1).

With the arrangement of the second modified secondary oil pump shown in FIGS. 6A–6B, in the stopped state of engine 1, neither of cooler pressure $P_C$, torque converter pressure Pt, line pressure $P_L$, and pilot pressure $P_P$ can be produced. Thus, there is no supply of the plunger retracted-position holding pressure to plunger retracting chamber 90 (see FIG. 6A), and therefore actuator piston 87 is kept at the spring-loaded position and thus lock pin 88 is held at the retracted position shown in FIG. 6A by means of the spring bias of return spring 89. Under these conditions, plunger 26 of secondary oil pump 22 is continually kept in contact with the cam contour surface of eccentric cam 24 by means of return spring 27. Thus, when the road wheels rotate owing to hauling or coasting in the engine stopped state, eccentric cam 24 is rotated in response to rotation of the road wheel, and as a result the reciprocating motion of plunger 26 is created so as to provide the pumping action of secondary oil pump 22. As previously described, by virtue of pumping action of secondary oil pump 22, the high-ratio starting can be prevented or avoided.

On the contrary, during operation of the prime mover (engine 1), the prime-mover-driven oil pump (primary oil pump 21) is driven and the pressurized working fluid is discharged from primary oil pump 21, thereby producing cooler pressure $P_C$, torque converter pressure Pt, line pressure $P_L$, and pilot pressure $P_P$. The plunger retracted-position holding pressure (corresponding to either of pressures $P_C$, Pt, $P_L$, and $P_P$) is supplied to plunger retracting chamber 90. Thus, during operation of engine 1, as shown in FIG. 6B, actuator piston 87 shifts to its protruded position (or the rightmost position) against the spring bias of return spring 89, and as a result lock pin 88 of actuator piston 87 is brought into engagement with pin slot 26a of plunger 26. As a result, plunger 26 of secondary oil pump 22 is held at the retracted position (see FIG. 6B) at which plunger 26 is positioned to be spaced apart from the cam contour surface of eccentric cam 24. For the reason discussed above, during operation of engine 1 plunger 26 of secondary oil pump 22 is not driven by eccentric cam 24 that is rotated in response to input rotation transmitted from the road wheels to countershaft 15. That is, even when eccentric cam 24 is rotated in response to input rotation transmitted from the road wheels to countershaft 15 during operation of engine 1, the second modified secondary oil pump shown in FIGS. 6A–6B can be held at the inoperative state. Therefore, when the vehicle is in the normal running state during operation of engine 1, secondary oil pump 22 (output-rotation driven pump) can be held at the inoperative state, thus avoiding secondary oil pump 22 from being wastefully driven during operation of engine 1 and consequently reducing the running resistance, in other words, fuel consumption.

As discussed above, according to the secondary oil pump structure shown in FIGS. 2A–2C, the first modified secondary oil pump structure shown in FIGS. 5A–5C, and the second modified secondary oil pump structure shown in FIGS. 6A–6B, secondary oil pump 22 is designed to be held at the inoperative state during operation of engine 1 (during operation of primary oil pump), by the use of either one of cooler pressure $P_C$, torque converter pressure Pt, line pressure $P_L$, and pilot pressure $P_P$ as the plunger retracted-position holding pressure, and by holding radial plunger 26 of secondary oil pump 22 at the retracted position (the plunger inoperative position shown in FIGS. 2C, 5C, and 6B). In order to provide the same operation and effects as the secondary oil pump structures shown in FIGS. 2A–2C, 5A–5C, and 6A–6B, the secondary oil pump may be constructed and modified as shown in FIG. 7.

Figure 7:
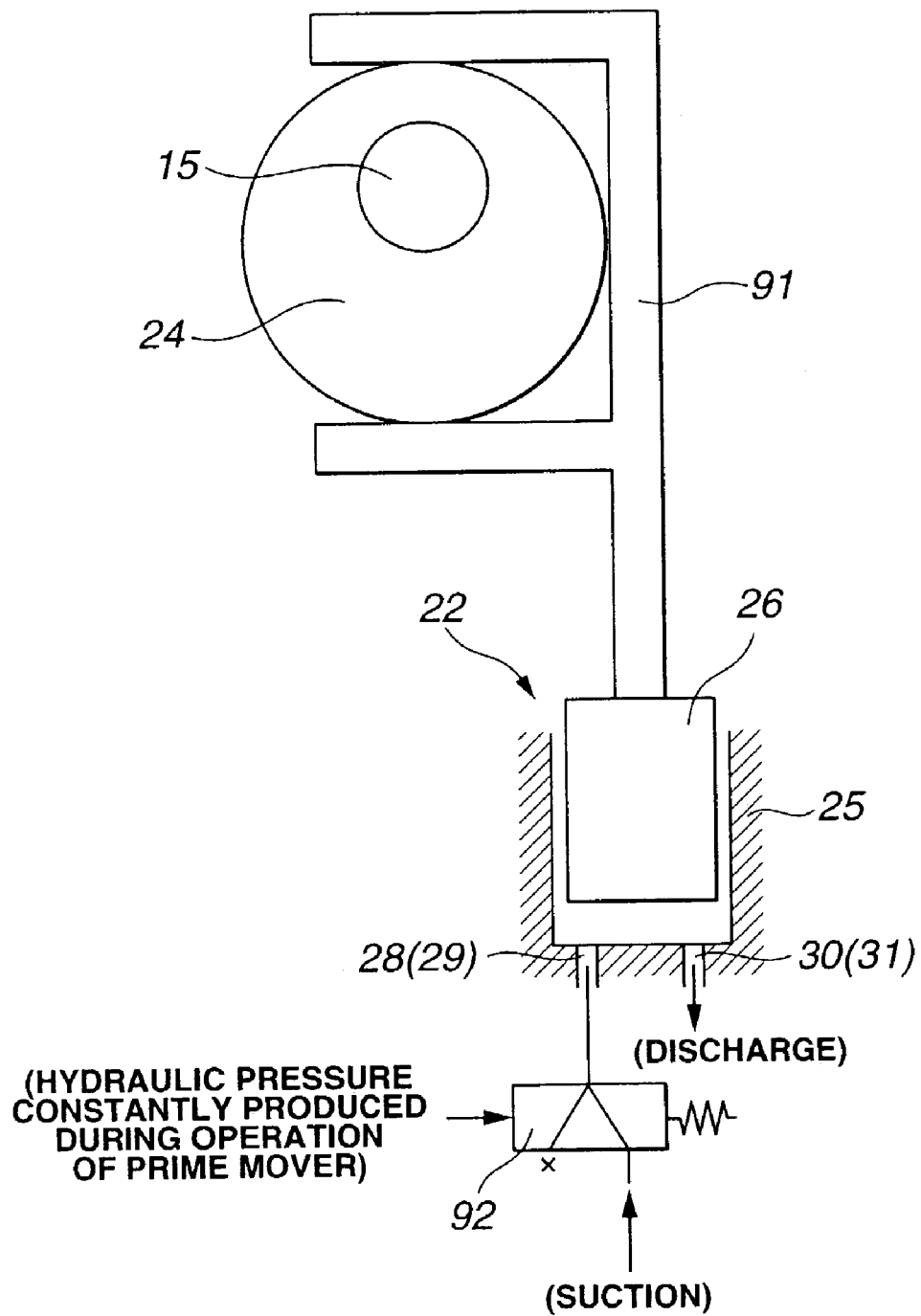
FIG. 7 is an enlarged longitudinal cross-sectional view illustrating an essential part of a third modified secondary oil pump.

The third modified secondary oil pump 22 shown in FIG. 7 is similar to the secondary oil pump structure shown in FIGS. 2A–2C. Thus, reference signs used to designate elements in the pump shown in FIGS. 2A–2C will be applied to the corresponding elements used in the third modified secondary oil pump shown in FIG. 7, for the purpose of comparison of the two different secondary oil pumps. Instead of using return spring 27 (see FIGS. 2A–2C, 5A–5C, and 6A–6B) that permanently biases or forces plunger 26 into contact with the cam contour surface of eccentric cam 24, the secondary oil pump structure of the third modification shown in FIG. 7 uses a cam follower 91 that is an output link of the cam mechanism containing eccentric cam 24 having a driven connection with countershaft 15. As clearly shown in FIG. 7, cam follower 91 has two cam-connection points diametrically opposed to each other with respect to the axis of the circular eccentric cam 24, such that the line segment between and including the two cam-connection points of cam follower 91 is arranged in parallel with the two opposite directions of the stroke of plunger 26. In other words, cam follower 91 is conditioned in engagement with eccentric cam 24 in the two opposite directions of the stroke of plunger 26. In order to convert rotary motion of eccentric cam 24 to reciprocating motion of plunger 26 and to transmit the input motion of eccentric cam 24 via cam follower 91 to plunger 26 in the opposite plunger stroke directions (in both of the suction and discharge directions), cam follower 91 (the output link of eccentric cam 24) is cam-connected at the two cam-connection points to eccentric cam 24 and fixedly connected at the other end to plunger 26. That is, cam follower 91 shown in FIG. 7 constructs a positive motion cam mechanism in conjunction with eccentric cam 24. The use of cam follower 91, constructing part of the positive motion cam mechanism, eliminates the necessity of return spring 27. The third modified secondary oil pump shown in FIG. 7 also includes a selector valve 92, which is comprised of a two-way three-port directional control valve having a pump port, a suction port, a drain port, and a spring-loaded valve spool. The pump port of selector valve 92 is connected to inlet port 28 (or inlet valve) of secondary oil pump 22. As described previously, when the prime mover (engine 1) is stopped and thus there is no supply of pressurized working fluid from primary oil pump 21, neither of cooler pressure $P_C$, torque converter pressure Pt, line pressure $P_L$, and pilot pressure $P_P$ can be produced. In the stopped state of engine 1, the spool of selector valve 92 is held at its spring-loaded position (a first spool position) that fluid communication between the pump port and the suction port is normally established by way of the spring bias of the selector-valve return spring that acts on one spool end or the right-hand spool end (viewing FIG. 7). The suction port of selector valve 92 is communicated through a first intermediate oil passage (not shown) with a lower-level portion than the level of the working fluid (traction oil) stored in the oil pan, so as to lead the secondary-oil-pump inlet port 28 to the hydraulic oil in the oil pan. On the other hand, the drain port of selector valve 92 is communicated with a second intermediate oil passage (not shown) with a higher-level portion than the oil level of working fluid stored in the oil pan, so as to lead the secondary-oil-pump inlet port 28 to the air in the oil pan.

Concretely, with the selector-valve spool held at the spring-loaded position (the first spool position), inlet port 28 is communicated with the oil-pan lower-level portion through the pump port and the suction port communicated with each other. Thus, in the stopped state of the prime mover (engine 1), the third modified secondary oil pump system of FIG. 7, including cam follower 91 (constructing the positive motion cam mechanism in conjunction with eccentric cam 24), and selector valve 92 (two-way three-port directional control valve) whose suction port is communicated with the oil-pan lower-level portion lower than the oil level of the oil pan and whose drain port is communicated with the oil-pan higher-level portion higher than the oil level, enables the pumping action of secondary oil pump 22.

On the contrary, during operation of the prime mover (engine 1), the prime-mover-driven oil pump (primary oil pump 21) is driven and the pressurized working fluid is discharged from primary oil pump 21, thereby producing cooler pressure $P_C$, torque converter pressure Pt, line pressure $P_L$, and pilot pressure $P_P$. Either of pressures $P_C$, Pt, $P_L$, and $P_P$ is supplied to selector valve 92 and acts on the other selector-valve spool end or the right-hand spool end (viewing FIG. 7), in such a manner as to force the selector-valve spool against the spring bias toward the second spool position that fluid communication between the pump port and the drain port is established. With the selector-valve spool held at the second spool position, inlet port 28 is communicated with the oil-pan higher-level portion through the pump port and the drain port communicated with each other. Thus, during operation of the prime mover (engine 1), the third modified secondary oil pump system of FIG. 7, including cam follower 91 and selector valve 92, inhibits the pumping action of secondary oil pump 22 and permits secondary oil pump 22 to be held in its unloaded condition.

As appreciated from the above, according to the third modified secondary oil pump structure shown in FIG. 7, secondary oil pump 22 can provide the pumping action only when the road wheels rotate owing to hauling or coasting in the engine stopped state. Even when plunger 26 of secondary oil pump 22 is reciprocating by means of the previously-noted positive motion cam mechanism (comprised of eccentric cam 24 and cam follower 91) that operates in response to input rotation transmitted from the road wheels to countershaft 15 during operation of the prime mover (engine 1), the secondary oil pump system of the third modification shown in FIG. 7 can be held in the unloaded condition. Additionally, the use of the positive motion cam mechanism (comprised of eccentric cam 24 and cam follower 91) it is possible to eliminate the need to force plunger 26 toward eccentric cam 24 by means of a spring bias. This contributes to reduced sliding resistance, thus resulting in a reduction in the running resistance, that is, reduced fuel consumption during operation of the prime mover, such as during a usual vehicle driving.

The entire contents of Japanese Patent Application No. 2002-217675 (filed Jul. 26, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A toroidal continuously variable transmission comprising:
   an input disk to which rotation of a prime mover is transmitted;
   an output disk coaxially arranged with and opposed to the input disk, the output disk adapted to have a driving connection with road wheel;
   a power roller interposed between the input and output disks under axial preload for power transmission;
   a trunnion rotatably supporting the power roller to permit a tilting motion of the power roller about a trunnion axis perpendicular to a rotation axis of the power roller for ratio changing;
   a hydraulic servo mechanism connected to the trunnion to move the trunnion in a direction of the trunnion axis so as to cause the tilting motion of the power roller by creating an offset of the trunnion from a neutral position in the direction of the trunnion axis, the neutral position being a non-ratio-changing position at which the rotation axis of the power roller intersects a common rotation axis of the input and output disks;
   a primary oil pump driven by the prime mover to produce a hydraulic pressure;
   a secondary oil pump driven in response to rotation of the road wheel to produce a hydraulic pressure;
   the hydraulic servo mechanism hydraulically operated by either of the hydraulic pressure from the primary oil pump and the hydraulic pressure from the secondary oil pump; and
   wherein the secondary oil pump comprises a pumping element and a pump driving element; and
   wherein the secondary oil pump is held at the inoperative state by maintaining the pumping element in a spaced, contact-free relationship with the pump driving element by a modulated hydraulic pressure constantly produced during operation of the prime mover.

2. The toroidal continuously variable transmission as claimed in claim 1, wherein:
   the secondary oil pump is a reciprocating pump;
   the pumping element is a reciprocating pumping element; and
   the secondary oil pump is held at the inoperative state by holding the reciprocating pumping element at a stroke position where there is no motion transmission from the pump driving element to the reciprocating pumping element, by the modulated hydraulic pressure constantly produced during operation of the prime mover.

3. The toroidal continuously variable transmission as claimed in claim 1, further comprising:
   an actuator arranged close to the secondary oil pump and having a lock pin that is hydraulically operated by the modulated hydraulic pressure constantly produced during operation of the prime mover;
   wherein the secondary oil pump is a reciprocating pump;
   wherein the pumping element is a reciprocating pumping element formed with a pin slot; and
   wherein the secondary oil pump is held at the inoperative state by holding the reciprocating pumping element at a stroke position where there is no motion transmission from the pump driving element to the reciprocating pumping element, by bringing the lock pin into engagement with the pin slot by application of the modulated hydraulic pressure, constantly produced during operation of the prime mover, to the actuator.

4. The toroidal continuously variable transmission as claimed in claim 1, further comprising;
a ratio-change-control hydraulic system that supplies the hydraulic pressure discharged from the secondary oil pump to the hydraulic servo mechanism to prevent the offset of the trunnion in the trunnion-axis direction, corresponding to an upshift, which occurs due to rotation of the road wheel in a stopped state of the prime mover.

5. The toroidal continuously variable transmission as claimed in claim 4, wherein:
a hydraulic pressure in a cooling-and-lubricating circuit of the ratio-change-control hydraulic system, which is modulated from the hydraulic pressure discharged from the primary oil pump, is used as the modulated hydraulic pressure constantly produced during operation of the prime mover.

6. The toroidal continuously variable transmission as claimed in claim 4, wherein:
a hydraulic pressure in a torque converter pressure circuit of the ratio-change-control hydraulic system, which is modulated from the hydraulic pressure discharged from the primary oil pump, is used as the modulated hydraulic pressure constantly produced during operation of the prime mover.

7. The toroidal continuously variable transmission as claimed in claim 4, wherein:
a hydraulic pressure in a line pressure circuit of the ratio-change-control hydraulic system, which is modulated from the hydraulic pressure discharged from the primary oil pump, is used as the modulated hydraulic pressure constantly produced during operation of the prime mover.

8. The toroidal continuously variable transmission as claimed in claim 4, wherein:
a hydraulic pressure in a pilot pressure circuit of the ratio-change-control hydraulic system, which is modulated to a constant pressure level by pressure-reducing a line pressure modulated from the hydraulic pressure discharged from the primary oil pump, is used as the modulated hydraulic pressure constantly produced during operation of the prime mover.

9. The toroidal continuously variable transmission as claimed in claim 4, wherein:
the ratio-change-control hydraulic system constantly produces and outputs the modulated hydraulic pressure to the secondary oil pump during operation of the prime mover to hold the secondary oil pump at an inoperative state during the operation of the prime mover.

10. A toroidal continuously variable transmission comprising:
an input disk to which rotation of a prime mover is transmitted;
an output disk coaxially arranged with and opposed to the input disk, the output disk adapted to have a driving connection with a road wheel;
a power roller interposed between the input and output disks under axial preload for power transmission;
a trunnion rotatably supporting the power roller to permit a tilting motion of the power roller about a trunnion axis perpendicular to a rotation axis of the power roller for ratio changing;
a hydraulic servo mechanism connected to the trunnion to move the trunnion in a direction of the trunnion axis so as to cause the tilting motion of the power roller by creating an offset of the trunnion from a neutral position in the direction of the trunnion axis, the neutral position being a non-ratio-changing position at which the rotation axis of the power roller intersects a common rotation axis of the input and output disks;
a primary oil pump driven by the prime mover to produce a hydraulic pressure;
a secondary oil pump driven in response to rotation of the road wheel to produce a hydraulic pressure;
the hydraulic servo mechanism hydraulically operated by either of the hydraulic pressure from the primary oil pump and the hydraulic pressure from the secondary oil pump;
a ratio-change-control hydraulic system that supplies the hydraulic pressure discharged from the secondary oil pump to the hydraulic servo mechanism to prevent the offset of the trunnion in the trunnion-axis direction, corresponding to an upshift, which occurs due to rotation of the road wheel in a stopped state of the prime mover;
the ratio-change-control hydraulic system constantly produces and outputs a modulated hydraulic pressure to the secondary oil pump during operation of the prime mover to hold the secondary oil pump at an inoperative state during operation of the prime mover; and
a feedback device through which a tendency of the offset of the trunnion in the trunnion-axis direction, corresponding to the upshift, is fed back to the hydraulic servo mechanism, so that the trunnion returns to the neutral position in presence of a drop in the hydraulic pressure discharged from the secondary oil pump during rotation of the road wheel in a reverse-rotational direction in the engine stopped state.

11. The toroidal continuously variable transmission as claimed in claim 10, wherein:
the secondary oil pump comprises a reciprocating pump, the reciprocating pump comprising:
(a) a reciprocating pumping element;
(b) a positive motion cam mechanism comprising:
(i) a positive motion cam serving as a pump driving element and driven in response to rotation of the road wheel; and
(ii) a cam follower being conditioned in engagement with the positive motion cam in two opposite directions of a stroke of the reciprocating pumping element to transmit input motion of the positive motion cam via the cam follower to the reciprocating pumping element in the opposite stroke directions.

12. The toroidal continuously variable transmission as claimed in claim 11, further comprising:
a selector valve being responsive to the modulated hydraulic pressure constantly produced during operation of the prime mover, for switching from (i) a first operating mode at which a pumping action of the secondary oil pump is permitted to (ii) a second operating mode at which the secondary oil pump is held at an unloaded condition.

13. The toroidal continuously variable transmission as claimed in claim 12, wherein:
the selector valve comprises a two-way three-port directional control valve having a pump port connected to an inlet port of the secondary oil pump, a suction port communicated with an oil-pan lower-level portion lower than an oil level of an oil pan, a drain port communicated with an oil-pan higher-level portion higher than the oil level of the oil pan, and a spring-loaded valve spool slidably movable between a first spool position corresponding to a spring-loaded position at which fluid communication between the inlet port of the secondary oil pump and the suction port of the selector valve is established to lead the inlet port to working fluid in the oil pan and a second spool position at which fluid communication between the inlet port of the secondary oil pump and the drain port of the selector valve is established to lead the inlet port to air in the oil pan.

14. A continuously variable transmission comprising:

an input disk to which rotation of a prime mover is transmitted;

an output disk coaxially arranged with and opposed to the input disk, the output disk adapted to have a driving connection with a road wheel;

a power roller interposed between the input and output disks under axial preload for power transmission;

a trunnion rotatably supporting the power roller to permit a tilting motion of the power roller about a trunnion axis perpendicular to a rotation axis of the power roller for ratio changing;

a hydraulic servo mechanism connected to the trunnion to move the trunnion in a direction of the trunnion axis so as to cause the tilting motion of the power roller by creating an offset of the trunnion from the neutral position in the direction of the trunnion axis, the neutral position being a non-ratio-changing position at which the rotation axis of the power roller intersects a common rotation axis of the input and output disks;

a secondary oil pump driven in response to rotation of the road wheel to produce a hydraulic pressure;

the hydraulic servo mechanism hydraulically operated by either of the hydraulic pressure from the primary oil pump and the hydraulic pressure from the secondary oil pump;

a ratio-change-control hydraulic system that supplies the hydraulic pressure discharged from the secondary oil pump to the hydraulic servo mechanism to prevent the offset of the trunnion in the trunnion-axis direction, corresponding to an upshift, which occurs due to rotation of the road wheel in a stopped state of the prime mover; and the ratio-change-control hydraulic system constantly produces and outputs a modulated hydraulic pressure to the secondary oil pump during operation of the prime mover to hold the secondary oil pump at an inoperative state during operation of the prime mover, wherein the hydraulic servo mechanism comprises:

an axially slidable servo piston which is fixedly connected to the trunnion and by which a low-pressure chamber and a high-pressure chamber are defined; and a biasing device that is disposed in the low-pressure chamber to force the servo piston toward a stroke position corresponding to the neutral position of the trunnion, and to prevent a tendency of the offset of the trunnion in the trunnion-axis direction, corresponding to the upshift by returning the trunnion to the neutral position by a spring bias of the biasing device when the low-pressure chamber and the high-pressure chamber defined on both sides of the servo piston are held at non-pressure states during rotation of the road wheel in a normal-rotational direction in the engine stopped state.

* * * * *